C

(12) United States Patent
Kanzian et al.

(10) Patent No.: US 10,090,765 B1
(45) Date of Patent: Oct. 2, 2018

(54) MULTI-PHASE CONVERTER CONTROLLER USING DYNAMIC HYSTERESIS VALUE

(71) Applicant: Infineon Technologies AG, Neubiberg (DE)

(72) Inventors: Marc Kanzian, Wernberg (AT); Matteo Agostinelli, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/653,056

(22) Filed: Jul. 18, 2017

(51) Int. Cl.
*H02M 3/157* (2006.01)
*H02M 3/158* (2006.01)

(52) U.S. Cl.
CPC ....... *H02M 3/1584* (2013.01); *H02M 3/1588* (2013.01); *H02M 2003/1586* (2013.01)

(58) Field of Classification Search
CPC ....... H02M 2003/1586; H02M 3/1563; H02M 3/157
See application file for complete search history.

(56) References Cited

U.S. PATENT DOCUMENTS

| | | | |
|---|---|---|---|
| 2006/0012351 A1* | 1/2006 | Moussaoui | H02M 3/1584 323/271 |
| 2011/0115453 A1 | 5/2011 | Marsili et al. | |
| 2013/0043852 A1 | 2/2013 | Marsili et al. | |
| 2013/0127430 A1* | 5/2013 | Leung | H02M 3/157 323/282 |

OTHER PUBLICATIONS

Biel, et al., "Sliding Mode Control Multiphase Buck Converter Implementation Issues," In Proceedings of the 2010 11th International Workshop on Variable Structure Systems (VSS 2010), pp. 434-439, Mexico City, Mexico, Jun. 2010, 6 pp.
Berger, et al., "Unified Digital Sliding Mode Control with Inductor Current Ripple Reconstruction for DC-DC Converters," In Proceedings of the 2015 IEEE International Symposium on Circuits and Systems (ISCAS 2015), Lisbon, Portugal, May 2015, pp. 213-216.
Tan, et al., "General Design Issues of Sliding-Mode Controllers in DC-DC Converters," IEEE Transactions on Industrial Electronics, vol. 55, No. 3, Mar. 2008, pp. 1160-1174.

(Continued)

*Primary Examiner* — Harry Behm
(74) *Attorney, Agent, or Firm* — Shumaker & Sieffert, P.A.

(57) ABSTRACT

In one example, a circuit for controlling a multi-phase converter is configured to determine an operating condition at a multi-phase converter module. Each phase switching module of a plurality of phase switching modules is configured to electrically couple, based on a respective switching signal, a voltage source to a respective phase of the multi-phase converter module. The circuit is further configured to, for each switching signal, generate an operating value using the operating condition and determine a dynamic hysteresis value for a next switching period using a duration of a previous switching period and a phase shift. The circuit is further configured to, for each switching signal, compare the operating value to a reference value with a hysteretic comparator function using the dynamic hysteresis value and generate the respective switching signal based on the comparison of the operating value to the reference value.

18 Claims, 13 Drawing Sheets

(56) References Cited

OTHER PUBLICATIONS

Kumar, et al., "Unified Digital Current Mode Control Tuning with Near Optimal Recovery in a CCM Buck Converter," IEEE Transactions on Power Electronics, vol. 31, No. 12, Dec. 2016, pp. 8461-8470.

Labbe, et al., "An Integrated Sliding-Mode Buck Converter With Switching Frequency Control for Battery-Powered Applications," IEEE Transactions on Power Electronics, vol. 28, No. 9, Sep. 2013, pp. 4318-4326.

Agostinelli, et al., "Constant switching frequency techniques for sliding mode control in DC-DC converters," In Proceedings of the Joint INDS'11 & ISTET'11, 5 pp.

Lee, "Chattering Suppression in Sliding Mode Control System," Ohio State University, Jul. 21, 2007, 150 pp.

Lee, "Chattering reduction using multiphase sliding mode control," International Journal of Control, vol. 82, No. 9, Sep. 2009, 18 pp.

\* cited by examiner

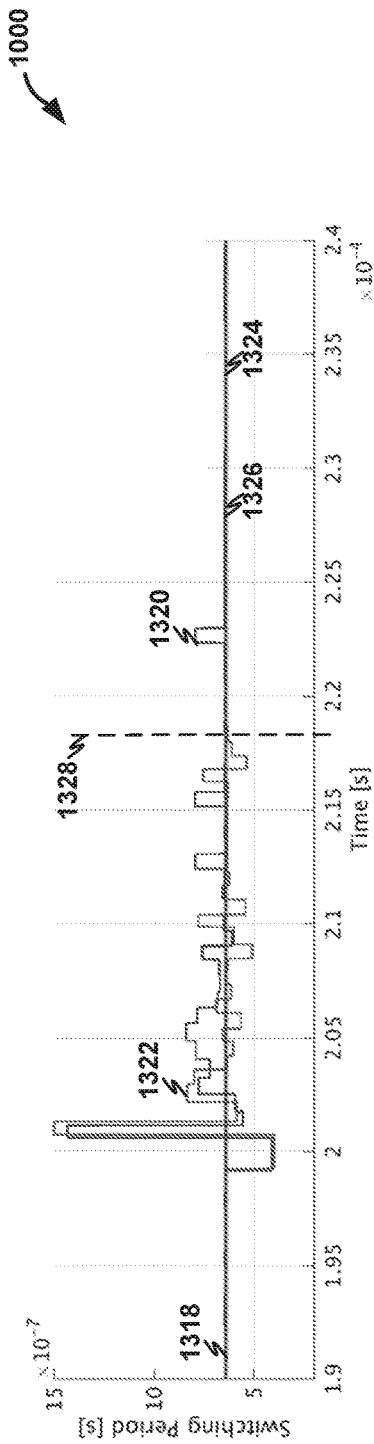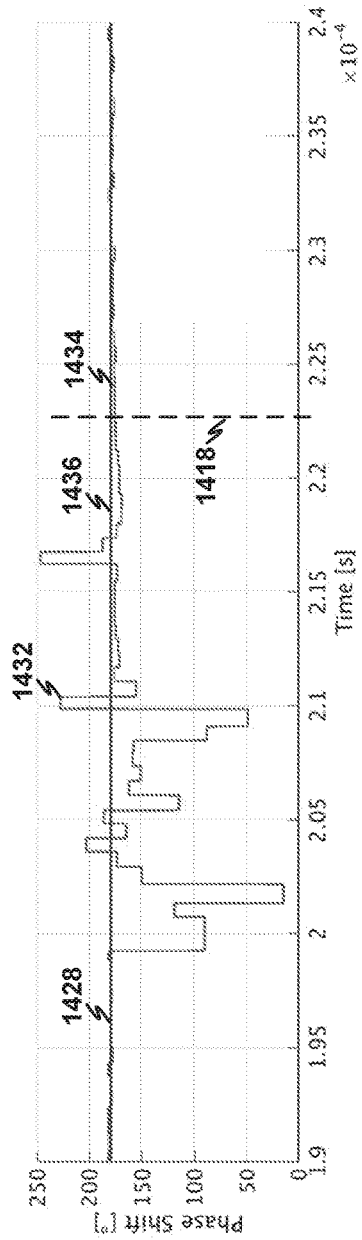
FIG. 13
FIG. 14

MULTI-PHASE CONVERTER CONTROLLER USING DYNAMIC HYSTERESIS VALUE

TECHNICAL FIELD

This disclosure relates to a control of a multi-phase converter, such as a 2-phase buck converter.

BACKGROUND

Multi-phase converters (also known as, "interleaved converters") are typically employed in order to improve the performance of the power conversion at higher loads. Multi-phase converters reduce direct current (DC) current for each phase compared to similar single-phase converters, therefore allowing the use of lower-rated components such as switches and passives. Additionally, multi-phase converters allow for interleaving, which increases an effective switching frequency compared to similar single-phase converters, therefore reducing the ripple on the output voltage. A multi-phase converter controller generates switching signals for operating a multi-phase converter to generate a desired output.

SUMMARY

In general, this disclosure is directed to techniques for controlling a multi-phase converter. To achieve a desired constant switching frequency and permit interleaving operation of a multi-phase converter, a multi-phase converter controller uses a dynamic hysteresis value. For example, the multi-phase converter controller modifies the dynamic hysteresis value to achieve a fixed switching frequency. In another example, the multi-phase converter controller modifies the dynamic hysteresis value to control a phase shift between phases to permit interleaving operation of a multi-phase converter.

In an example, a circuit for controlling a multi-phase converter is configured to determine one or more operating conditions at a multi-phase converter module. Each phase switching module of a plurality of phase switching modules is configured to electrically couple, based on a respective switching signal of a plurality of switching signals, a voltage source to a respective phase of the multi-phase converter module. The circuit is further configured to generate, for each switching signal of the plurality of switching signals, an operating value for a respective switching signal of the plurality of switching signals using the one or more operating conditions and determine, for each switching signal of the plurality of switching signals, a dynamic hysteresis value for a next switching period of the respective switching signal using a duration of a previous switching period of the respective switching signal and a phase shift between the respective switching signal and a switching signal of the plurality of switching signals that is different than the respective switching signal. The circuit is further configured to compare, for each switching signal of the plurality of switching signals, the operating value to a reference value with a hysteretic comparator function using the dynamic hysteresis value and generate, for each switching signal of the plurality of switching signals, the respective switching signal based on the comparison of the sliding function to the reference value.

In another example, a method for controlling a multi-phase converter, the method includes determining one or more operating conditions at a multi-phase converter module. Each phase switching module of a plurality of phase switching modules is configured to electrically couple, based on a respective switching signal of a plurality of switching signals, a voltage source to a respective phase of the multi-phase converter module. The method further includes generating, for each switching signal of the plurality of switching signals, an operating value for a respective switching signal of the plurality of switching signals using the one or more operating conditions and determining, for each switching signal of the plurality of switching signals, a dynamic hysteresis value for a next switching period of the respective switching signal using a duration of a previous switching period of the respective switching signal and a phase shift between the respective switching signal and a switching signal of the plurality of switching signals that is different than the respective switching signal. The method further includes comparing, for each switching signal of the plurality of switching signals, the operating value to a reference value with a hysteretic comparator function using the dynamic hysteresis value and generating, for each switching signal of the plurality of switching signals, the respective switching signal based on the comparison of the sliding function to the reference value.

In another example, circuit for a multi-phase converter includes a multi-phase converter module, a plurality of phase switching modules, and a control module. The multi-phase converter module is for supplying an output voltage to a load. Each phase switching module of the plurality of phase switching modules is configured to electrically couple, based on a respective switching signal of a plurality of switching signals, a voltage source to a respective phase of the multi-phase converter module. The control module configured to, for each switching signal of the plurality of switching signals, generate a sliding function for a respective switching signal of the plurality of switching signals using the one or more operating conditions, determine a dynamic hysteresis value for a next switching period of the respective switching signal using a duration of a previous switching period of the respective switching signal and a phase shift between the respective switching signal and a switching signal of the plurality of switching signals that is different than the respective switching signal, compare the sliding function to a reference value with a hysteretic comparator function using the dynamic hysteresis value, and generate the respective switching signal based on the comparison of the sliding function to the reference value.

Details of these and other examples are set forth in the accompanying drawings and the description below. Other features, objects, and advantages will be apparent from the description and drawings, and from the claims.

BRIEF DESCRIPTION OF DRAWINGS

FIG. 13 is a graphical illustration of a switching period performance of sliding mode control using a dynamic hysteresis value during the load transient of FIG. 11, in accordance with one or more techniques of this disclosure.

FIG. 14 is a graphical illustration of a phase shift performance of sliding mode control using a dynamic hysteresis value during the load transient of FIG. 11, in accordance with one or more techniques of this disclosure.

DETAILED DESCRIPTION

Figure 1:
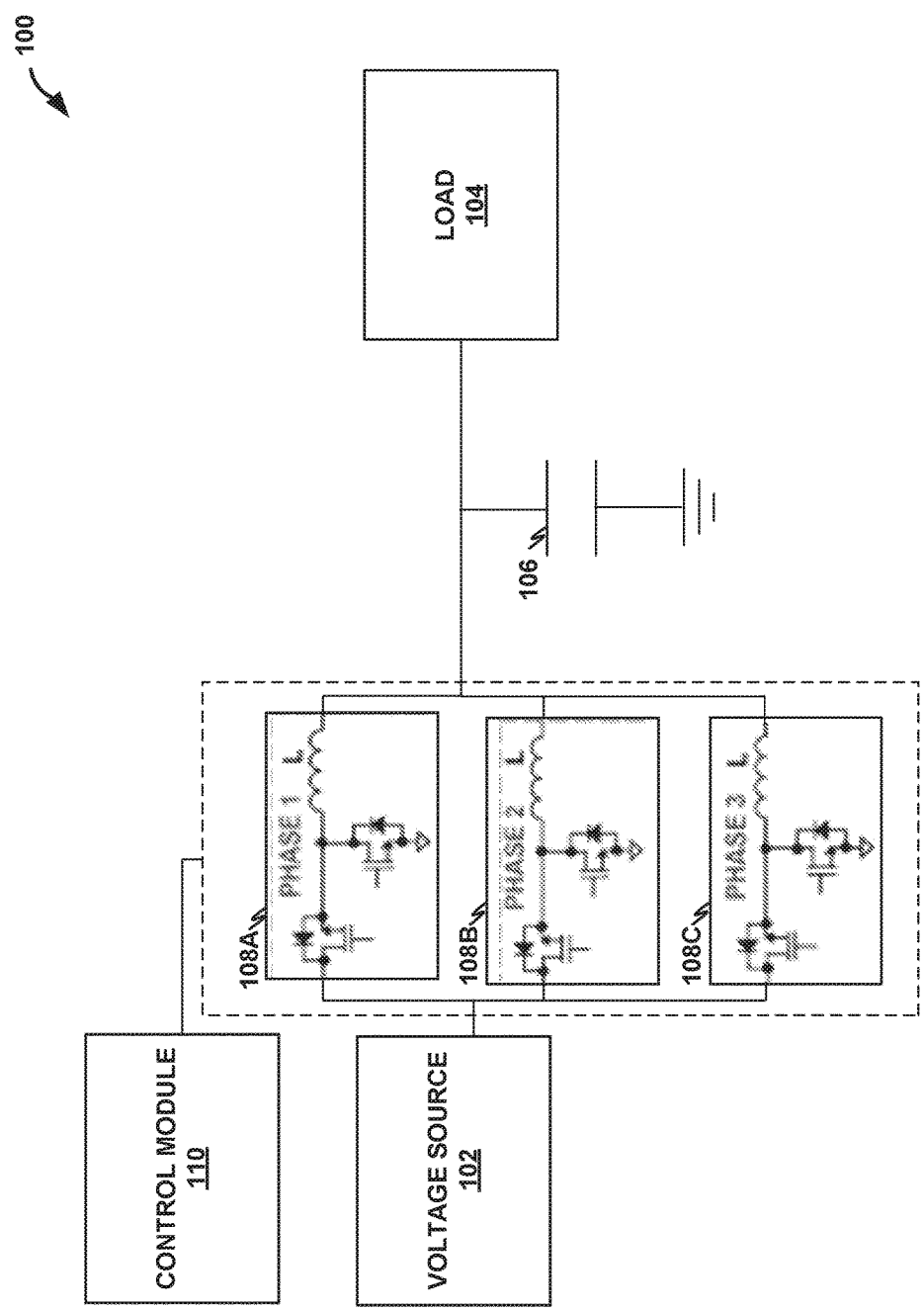
FIG. 1 is a block diagram illustrating an example system configured for a dynamic hysteresis value, in accordance with one or more techniques of this disclosure.

In general, this disclosure is directed to controlling a multi-phase converter using a dynamic hysteresis value. Although, the following discusses sliding mode control as an example control concept that may use a dynamic hysteresis value, in some examples, other control concepts may be used. For example, a control concept may use a hysteretic controller with a dynamic hysteresis value that compares an output voltage or inductor current to a reference value.

Sliding mode control is a control concept for direct current (DC) to DC converters that is relatively simple and robust compared to other control concepts. However, some sliding mode control concepts operate using a variable switching frequency operation, which is not acceptable in many applications. Furthermore, some sliding mode control concepts do not permit interleaved operation of multi-phase converters without modification of the sliding mode control law. As such, it is desirable for such controlling schemes to provide a fixed switching frequency and to permit interleaving without modification of a sliding mode control law used to control the multi-phase converter.

In a basic implementation of a sliding mode control, the output pulse width modulation (PWM) signal is typically generated by comparing a "sliding function" ("σ(x)") to a reference value (e.g. 0) with a hysteretic comparator. However, the resulting switching frequency will depend on line and/or load conditions and parameter variations of electrical components the multi-phase converter, therefore yielding a variable operating frequency.

Tan, S.-C., Lai, Y. M., & Tse, C. K. (2008), *General Design Issues of Sliding-Mode Controllers in DC-DC Converters*, IEEE Transactions on Industrial Electronics, 55(3), 1160-1174 and Agostinelli, M N, Priewasser, R, Marsili, S., & Huemer, M. (2011), "*Constant switching frequency techniques for sliding mode control in DC-DC converters*", In Proceedings of the Joint INDS' 11 & ISTET'11 (pp. 1-5), Klagenfurt (Austria) describe examples of sliding mode control. However, for multi-phase converters, in such examples, one phase is assigned as the master phase, whereas a modified switching surface for the other "slave" phases is necessary. The disadvantages of this solution are the requirement for the master phase to be always operational and the desired interleaved operation can only be achieved when constraints are met such as equations [1] and [2] for a Buck converter.

$$d < 0.5 \Rightarrow d > \frac{1}{N} \quad [1]$$

$$d > 0.5 \Rightarrow d < 1 - \frac{1}{N}, \quad [2]$$

In the above equations, "d" is the steady-state duty cycle and "N" is the number of phases. Because the duty cycle d is a function of the input voltage $v_{in}$ and desired output voltage $V_{ref}$, the number of phases for interleaving to depends on the conversion factor if this kind of sliding mode control is used.

Another implementation to maintain a constant switching frequency is to use a set-reset flip-flop in current-mode control. Such an implementation for a single-phase converter has been presented in Agostinelli, M., Priewasser, R, Marsili, S., & Huemer, M. (2011), "*Constant switching frequency techniques for sliding mode control in DC-DC converters*", In Proceedings of the Joint INDS'11 & ISTET'11 (pp. 1-5), Klagenfurt (Austria). In order to extend this concept to multi-phase converters, the set signals and compensation ramps have to be properly shifted. Moreover, using the set-reset flip-flop, as in current-mode control, may require a compensation ramp to prevent subharmonic oscillations and may cause degraded performance.

Furthermore, it is possible to implement the equivalent control command, as reported in Tan, S.-C., Lai, Y. M., & Tse, C. K. (2008), *General Design Issues of Sliding-Mode Controllers in DC-DC Converters*, IEEE Transactions on Industrial Electronics, 55(3), 1160-1174. In order to achieve interleaving, the ramp signals have to be properly shifted. The equivalent control command may have worse dynamic performance and robustness compared to sliding mode control with hysteretic comparator.

To address the foregoing issues and shortcomings of some types of systems, in accordance with one or more techniques described herein, a sliding mode controller for multi-phase DC-DC converters uses a dynamic hysteresis value, which achieves constant switching frequency and the desired interleaving of the phases by dynamic modulation of the hysteresis band. In this way, no master-slave operation is necessary and no constraint on the minimum number of required phases based on the required conversion ratio is imposed.

FIG. 1 is a block diagram illustrating an example system 100 configured for a dynamic hysteresis value, in accordance with one or more techniques of this disclosure. As illustrated in the example of FIG. 1, system 100 may include voltage source 102, load 104, capacitor 106, phased switching modules 108A-108N (collectively, switching modules 108 or multi-phase converter module 108), and control module 110. Although FIG. 1 illustrates phase switching modules 108 using a single voltage source, in some examples, a plurality of voltage sources may be used. For example, each phase switch module of phase switch modules 108 may be coupled to an individual voltage source. Although FIG. 1 illustrates a three-phase Buck converter, in some examples, other switched-mode power converters may be used. Examples of a switched-mode power converter may include, but are not limited to, flyback, forward, buck-boost, buck, boost, Ćuk, or another switched-mode power converter.

Voltage source 102 may be configured to provide electrical power to one or more other components of system 100. For instance, voltage source 102 may be configured to supply an input power to load 104. In some examples, voltage source 102 may include a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, voltage source 102 may include an output of a power converter or power inverter. For instance, voltage source 102 may include an output of a direct current (DC) to DC power converter, an alternating current (AC) to DC power converter, and the like. In some examples, voltage source 102 may represent a connection to an electrical supply grid. In some examples, the input power signal provided by voltage source 102 may be a DC input power signal. For instance, in some examples, voltage source 102 may be configured to provide a DC input power signal in the range of ~5 VDC to ~40 VDC.

Load 104 may include devices configured to accept power supplied by voltage source 102. In some examples, load 104 may be a resistive load. Examples of resistive loads may include seat adjustment, auxiliary heating, window heating, light emitting diodes (LEDs), rear lighting, or other resistive loads. In other examples, load 104 may be an inductive load. Examples of inductive loads may include actuators, motors, and pumps used in one or more of a wiper system, anti-lock brake system (ABS), electronic braking system (EBS), relay, battery disconnect, fan, or other systems that include inductive loads. In still other examples, load 104 may be a capacitive load. Examples of capacitive loads may include lighting elements, such as a Xenon arc lamp. In yet other examples, loads may be combinations of resistive, inductive, and capacitive loads.

Phase switching modules 108 may be each configured to electrically couple voltage source 102 to a respective phase of a multi-phase converter module. For example, phase switching module 108A may be configured to electrically couple voltage source 102 and load 104 when a first switching signal output by control module 110 indicates an activated state (e.g., logical '1'). In this example, phase switching module 108A may be configured to electrically decouple voltage source 102 and load 104 when the first switching signal output by control module 110 indicates a deactivated state (e.g., logical '0'). Similarly, phase switching module 108B may be configured to electrically couple voltage source 102 and load 104 when a second switching signal output by control module 110 indicates an activated state (e.g., logical '1'). In this example, phase switching module 108B may be configured to electrically decouple voltage source 102 and load 104 when the second switching signal output by control module 110 indicates a deactivated state (e.g., logical '0'). Similarly, phase switching module 108C may be configured to electrically couple voltage source 102 and load 104 when a second switching signal output by control module 110 indicates an activated state (e.g., logical '1'). In this example, phase switching module 108C may be configured to electrically decouple voltage source 102 and load 104 when the second switching signal output by control module 110 indicates a deactivated state (e.g., logical '0').

Each of phase switching modules 108 may include one or more switching elements. Examples of switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, depletion mode p-channel MOSFET (PMOS), enhancement mode PMOS, depletion mode n-channel MOSFET (NMOS), enhancement mode NMOS, double-diffused MOSFET (DMOS), or any other type of MOSFET, or any combination of the same. Examples of BJTs may include, but are not limited to, PNP, NPN, heterojunction, or any other type of BJT, or any combination of the same. It should be understood that switching elements may be a high side or low side. Additionally, switching elements may be voltage-controlled and/or current-controlled. Examples of current-controlled switching elements may include, but are not limited to, gallium nitride (GaN) MOSFETs, BJTs, or other current-controlled elements. It should be understood that in some examples, a diode (e.g., p-n junction diode) may be used instead of a switching element.

Control module 110 may be configured to control phase switching modules 108. For example, control module 110 may generate a switching signal for each phase switching module of phase switching modules 108. For instance, control module 110 may generate a first switching signal for phase switching module 108A. In this instance, control module 110 may generate a second switching signal for phase switching module 108B. In some examples, control module 110 may generate a switching signal for each phase switching module of phase switching modules 108 that includes a pulse width modulation (PWM) signal to selectively activate phase switching modules 108 to control a voltage, current, and/or power output to load 104. In some examples, control module 110 may be a microcontroller on a single integrated circuit containing a processor core, memory, inputs, and outputs. For example, control module 110 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, control module 110 may be a combination of one or more analog components and one or more digital components.

In accordance with one or more techniques described, control module 110 is configured to determine one or more operating conditions at multi-phase converter module 106. For example, control module 110 receives an indication of a voltage output by multi-phase converter module 106 to load 104. In some examples, control module 110 may receive an indication of a current flowing through a first inductor of a first phase of multi-phase converter module 106 and/or an indication of a current flowing through a second inductor of a second phase of multi-phase converter module 106 that is coupled to phase switching module 108B. For example, the indication of the current may be estimated from an input and output voltage. For instance, the indication of the current may be digitally reconstructed using one or more techniques described in A. Berger, M. Agostinelli, R Priewasser, S. Marsili, and M. Huemer, "*Unified digital sliding mode control with inductor current ripple reconstruction for DC-DC converters*," In Proceedings of the 2015 IEEE International Symposium on Circuits and Systems (ISCAS 2015), pp. 213-216, Lisbon, Portugal, May 2015. In some examples, the indication of the current may be measured.

Each phase switching module of phase switching modules 108 is configured to electrically couple, based on a respective switching signal of a plurality of switching signals, voltage source 102 to a respective phase of multi-phase converter module 108. For example, switching module 108A may be configured to couple voltage source 102 to a first phase of multi-phase converter module 108 only when a first switching signal ("$c_1$") is high (e.g., "$c_1=1$"). Similarly, switching module 108B may be configured to couple voltage source 102 to a second phase of multi-phase converter module 108 only when a second switching signal ("$c_2$") is high (e.g., "$c_2=1$").

Control module 110 is configured to generate, for each switching signal of the plurality of switching signals, an operating value for a respective switching signal of the plurality of switching signals using the one or more operating conditions. For example, control module 110 generates a first sliding function ("$\sigma_1(x)$") for the first switching signal ("$c_1$") using an indication of a voltage output by multi-phase converter module 108 to load 104 and/or an indication of a current flowing through a first inductor for a first phase of multi-phase converter module 108. In this example, control module 110 generates a second sliding function ("$\sigma_2(x)$") for the second switching signal ("$c_2$") using an indication of a voltage output by multi-phase converter module 108 to load 104 and/or an indication of a current flowing through a second inductor for a second phase of multi-phase converter module 108. In some examples, control module 110 generates the operating value to be representative of an output voltage or an inductor current of multi-phase converter module 108.

Control module 110 is configured to determine, for each switching signal of the plurality of switching signals, a dynamic hysteresis value for a next switching period of the respective switching signal using a duration of a previous switching period of the respective switching signal and a phase shift between the respective switching signal and a switching signal of the plurality of switching signals that is different than the respective switching signal. For example, control module 110 generates a dynamic hysteresis value ("$h_{P_A}[k+1]$") for the first switching signal ("$c_1$") using a duration of a previous switching period of the first switching signal ("$T_{swP_A}[k-1]$") and a phase shift between the first switching signal and the second switching signal. Similarly, control module 110 generates a dynamic hysteresis value ("$h_{P_B}[k+1]$") for the second switching signal ("$c_2$") using a duration of a previous switching period of the second switching signal ("$T_{swP_B}[k-1]$") and a phase shift between the first switching signal and the second switching signal.

Control module 110 is further configured to compare, for each switching signal of the plurality of switching signals, the operating value to a reference value with a hysteretic comparator function using the dynamic hysteresis value to generate the respective switching signal. For example, when the first switching signal is high (e.g., "$c_1=1$"), control module 110 compares the sliding function for the first switching signal to a reference value of 0 plus the dynamic hysteresis value. Similarly, when the first switching signal is low (e.g., "$c_1=0$"), control module 110 compares the sliding function for the first switching signal to a reference value of 0 minus the dynamic hysteresis value. Control module 110 is further configured to generate, for each switching signal of the plurality of switching signals, the respective switching signal based on the comparison of the sliding function to the reference value. For example, when the first switching signal is high (e.g., "$c_1=1$"), control module 110 generates the first switching signal to remain high until the sliding function exceeds the summation of the reference value (e.g., 0) and the dynamic hysteresis value. Similarly, when the first switching signal is low (e.g., "$c_1=0$"), control module 110 generates the first switching signal to remain low until the sliding function is less than the dynamic hysteresis value subtracted from the reference value (e.g., 0). Control module 110 may generate the second switching using substantially similar techniques.

Figure 2:
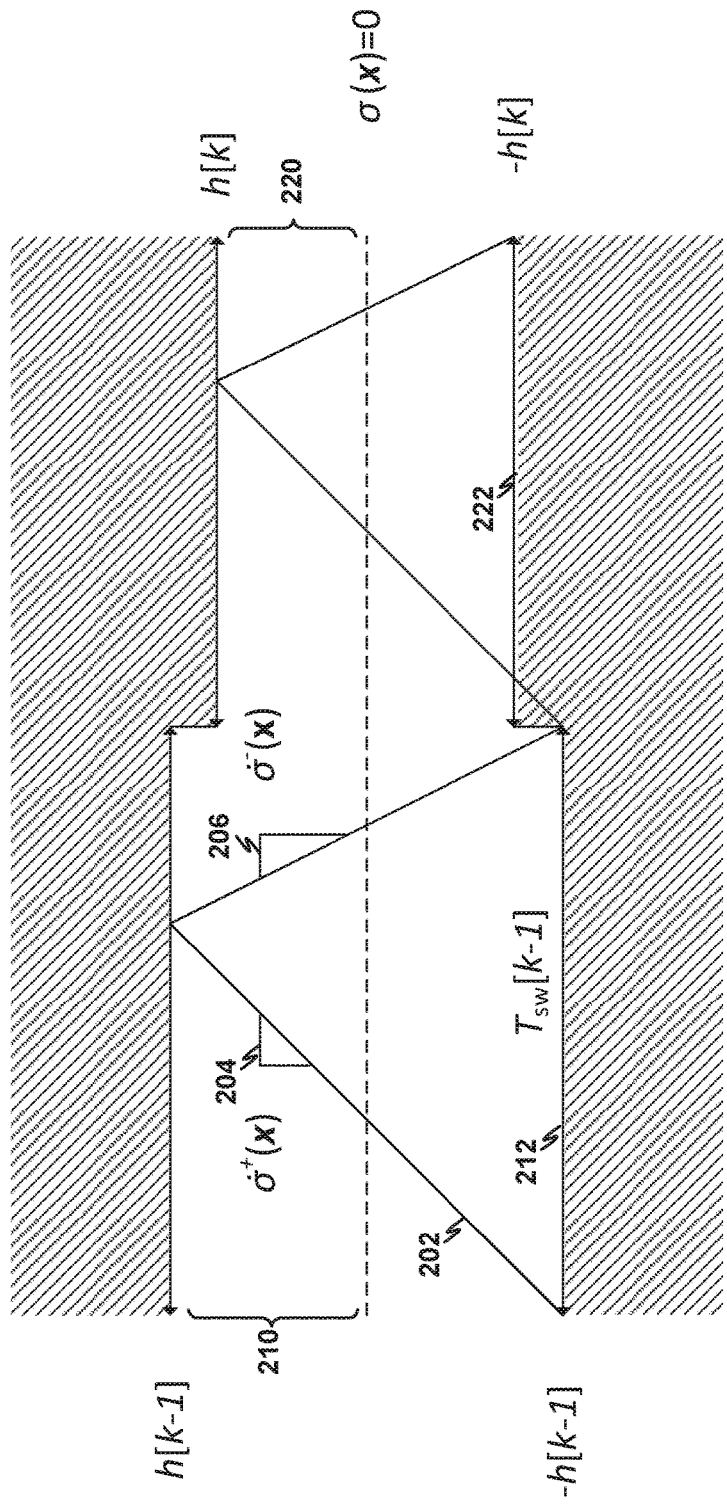
FIG. 2 is a graphical illustration of an influence of the dynamic hysteresis value on frequency, in accordance with one or more techniques of this disclosure.

FIG. 2 is a graphical illustration of an influence of the dynamic hysteresis value on frequency, in accordance with one or more techniques of this disclosure. The abscissa axis (e.g., horizontal) of FIG. 2 represents time and the ordinate axis (e.g., vertical) of FIG. 2 represents a value of sliding function 202 ("$\sigma(x)$"). FIG. 2 is discussed with respect to system 100 of FIG. 1 for exemplary purposes only.

In the example of FIG. 1, positive slope 204 ("$\sigma^+(x)$") is the positive derivative of sliding function 202 ("$\sigma(x)$") when a switching signal is high (e.g., c=1). Similarly, negative slope 206 ("$\sigma^-(x)$") is the negative derivative of sliding function 202 ("$\sigma(x)$") when a switching signal is low (e.g., c=0).

As shown, first hysteresis width 210 ("h[k−1]") is the dynamic hysteresis value during the previous switching cycle ("[k−1]") and first switching period length 212 ("$T_{sw}[k-1]$") is the switching period of the switching signal during the previous switching cycle. Similarly, second hysteresis width 220 ("h[k]") is dynamic hysteresis value during the current switching cycle ("[k]") and second switching period length 222 ("$T_{sw}[k]$") is the switching period of the switching signal during the current switching cycle.

In the example of FIG. 2, in response to control module 110 reducing the dynamic hysteresis value from first hysteresis width 210 to second hysteresis width 220, first switching period length 212 reduces to second switching period length 222, thereby increasing a frequency of the switching signal. In this way, control module 110 may control a frequency of the switching signal using the dynamic hysteresis value.

Figure 3:
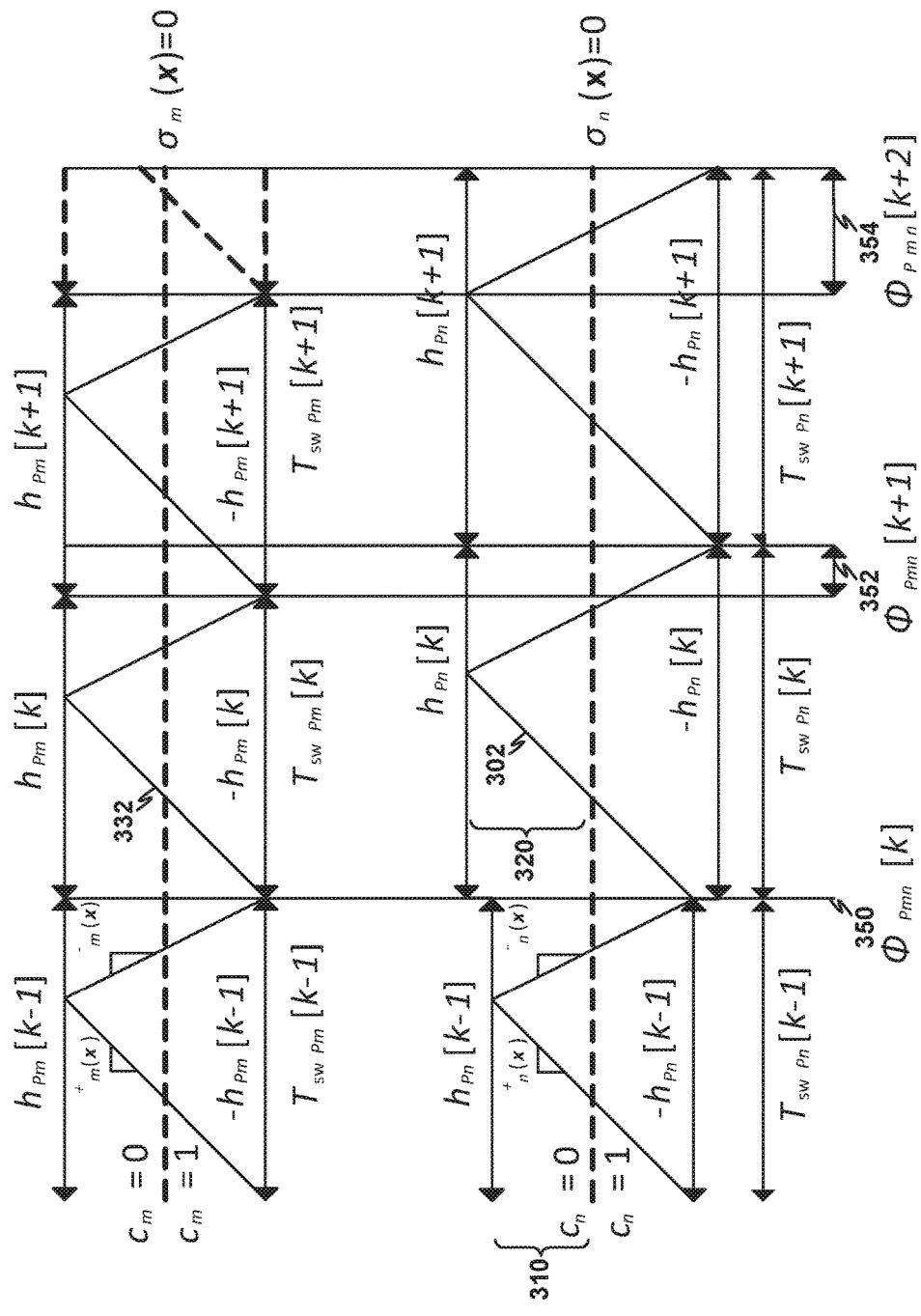
FIG. 3 is a graphical illustration of an influence of the dynamic hysteresis value on phase shift, in accordance with one or more techniques of this disclosure.

FIG. 3 is a graphical illustration of an influence of the dynamic hysteresis value on phase shift, in accordance with one or more techniques of this disclosure. The abscissa axis (e.g., horizontal) of FIG. 3 represents time and the ordinate axis (e.g., vertical) of FIG. 3 represents a value of sliding function 332 ("$\sigma_m(x)$") for a first phase ("m") and a value of sliding function 302 ("$\sigma_n(x)$") for a second phase ("n"). FIG. 3 is discussed with respect to system 100 of FIG. 1 for exemplary purposes only.

One or more techniques described herein, modulate the dynamic hysteresis value of the phases in order to achieve a desired phase shift as well as maintain constant switching frequency. As shown, sliding function 332 ("$\sigma_m(x)$") has a constant switching period length ($T_{sw}$) for the previous cycle ("[k−1]"), current cycle ("[k]"), and next cycle ("[k+1]") and has a constant hysteresis value during the previous cycle ("[k−1]"), current cycle ("[k]"), and next cycle ("[k+1]"). However, in the example of FIG. 3, control module 110 uses a dynamic hysteresis value that changes from first hysteresis width 310 ("h[k−1]") during the previous cycle ("[k−1]") to second hysteresis width 320 ("h[k−1]") during the current cycle ("[k]"). As shown, in response to increasing the dynamic hysteresis value from first hysteresis width 310 to second hysteresis width 320, phase shift 350 during the previous cycle ("[k−1]") increases to phase shift 352 during the current cycle ("[k]"). In this example, in response to increasing the dynamic hysteresis value from first hysteresis width 310 to second hysteresis width 320, phase shift 352 during the current cycle ("[k]") further increases to phase shift 354 during the next cycle ("[k+1]"). In this way, control module 110 may control a phase shift of the switching signal and another switching signal using the dynamic hysteresis value.

Figure 4:
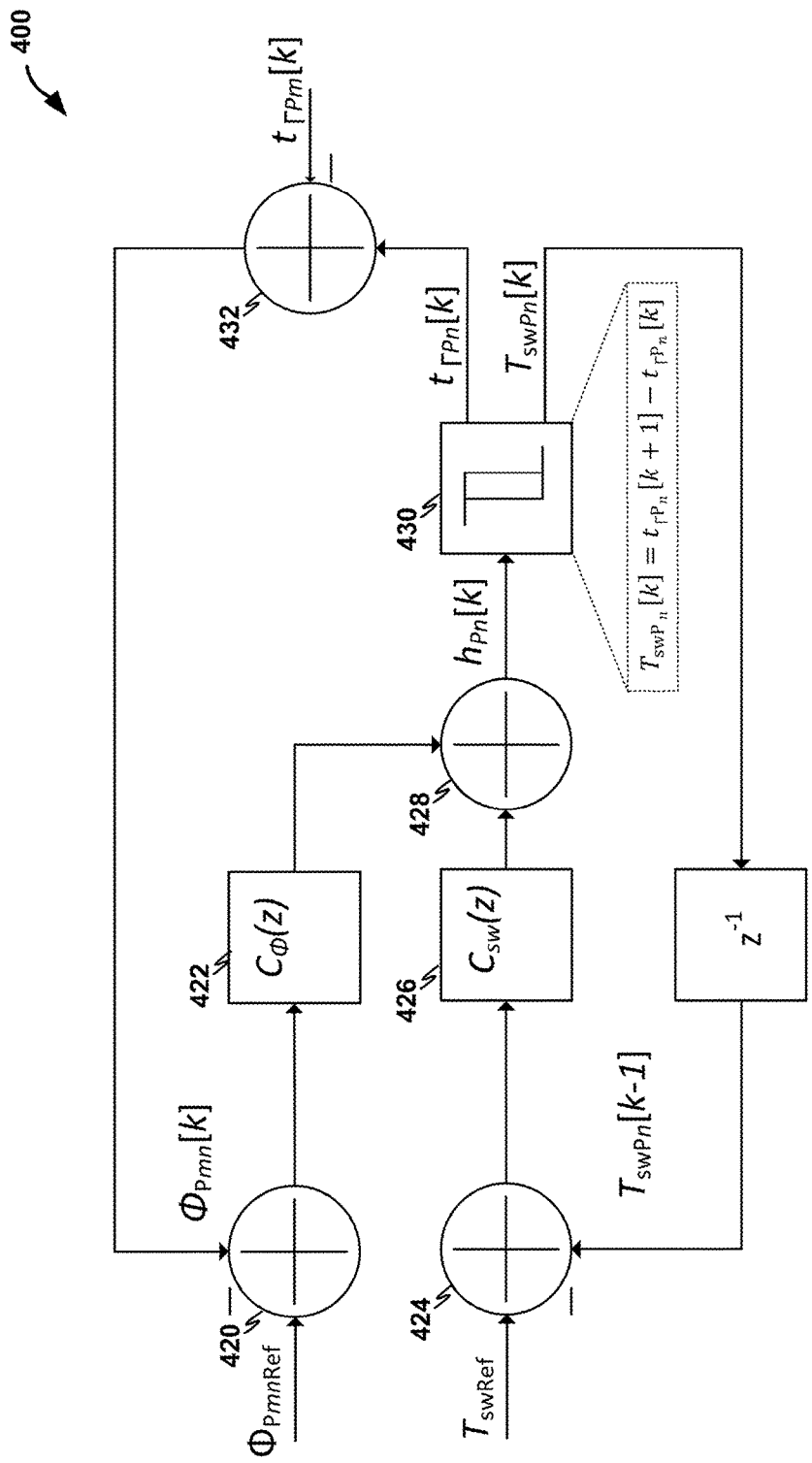
FIG. 4 is a block diagram illustrating a system for generating a dynamic hysteresis value, in accordance with one or more techniques of this disclosure.

FIG. 4 is a block diagram illustrating system 400 for generating a dynamic hysteresis value, in accordance with one or more techniques of this disclosure. As illustrated, system 400 may include summation block 420, controller 422, summation block 424, controller 426, summation block 428, hysteretic comparator 430, and summation block 432. FIG. 4 is discussed with reference to FIG. 1 for illustrative purposes only. Control module 110 may include a one or more digital components configured to perform one or more techniques illustrated in FIG. 4. In some examples, control module 110 may include a one or more analog components configured to perform one or more techniques illustrated in FIG. 4. In some examples, control module 110 may include a combination of one or more analog components and one or more digital components configured to perform one or more techniques illustrated in FIG. 4.

Summation block 420 is configured to subtract the phase shift from a reference phase shift to generate a phase shift error value for the respective switching signal. Controller 422 configured to receive the phase shift error value from the summation block 420 and generate a phase correction value for the respective switching signal. Controller 422 may be a proportional, integral, and derivative controller or another controller.

Summation block 424 is configured to subtract the duration of the previous switching period of the respective switching signal from a reference switching period to generate a switching period error value for the respective switching signal. Controller 426 is configured to receive the switching period error value from summation block 424 and generate a switching period correction value for the respective switching signal. Controller 426 may be a proportional, integral, and derivative controller or another controller.

Summation block 428 is configured to sum the phase correction value and the switching period correction value to generate the dynamic hysteresis value for the next switching period of the respective switching signal. Hysteretic comparator 430 is configured to receive the dynamic hysteresis value from summation block 428 and compare the sliding function to the reference value using the dynamic hysteresis value to generate a digital counter value at a rising edge in the current switching period of the respective switching signal and a duration of the current switching period of the respective switching signal.

Summation block 432 is configured to subtract a digital counter value at a rising edge in a current switching period of the switching signal of the plurality of switching signals that is different than the respective switching signal from the digital counter value at the rising edge in the current switching period of the respective switching signal to generate the phase shift.

Although FIG. 4 illustrates a unit delay block, the delay indicated by the unit delay block may be included due to the way the switching period is measured. In other words, the measurement of the switching period may be used in the next clock cycle, hence the delay. As such, in some implementations, there is no delay block.

As FIG. 4 illustrates, one or more techniques described herein, dynamically adjusts the hysteresis band based on the combined outputs of two controllers 422 and 426. Controller 426 ("$C_{sw}(z)$") compares the measured switching period to a reference. Controller 426 is responsible for maintaining a constant switching frequency. Controller 422 ("$C_\Phi(z)$") compares the measured phase shift to a reference. Controller 422 is responsible for maintaining the desired phase shift between phases.

Controller 426 may be designed based on the following open loop transfer function.

$$H_{swP_m}(z) := \frac{T_{swP_n}(z)}{h_{P_n}(z)} \quad [3]$$

Controller 422 may be designed based on the following open loop transfer function.

$$H_{phP_{mn}}(z) := \frac{\Phi_{P_{mn}}(z)}{\Delta h_{P_{mn}}(z)} (\Delta h_{P_{mn}}[k] := h_{P_n}[k] - h_{P_m}[k]) \quad [4]$$

The parameters of equations [3] and [3] are described in Table 1.

TABLE 1

| | |
|---|---|
| $t_{r_{P_m}}[k]$ | Digital counter value at rising edge of $c_m$ in the k-th switching cycle |
| $t_{r_{P_n}}[k]$ | Digital counter value at rising edge of $c_n$ in he k-th switching cycle |
| $\Phi_{P_{mn}Ref}$ | Desired phase shift between the phases m and n |
| $T_{swRef}$ | Desired switching period |
| $T_{swP_n}[k]$ | Measured duration of the k-th switching period for phase n |

TABLE 1-continued

| | |
|---|---|
| $\Phi_{P_{mn}}[k]$ | Measured phase shift between the phases m and n in the k-th switching period |
| $h_{P_n}[k]$ | Hysteresis value during the k-th switching period for phase n |

The duration of the current ("[k]") switching period is calculated as $T_{swP_n}[k]=t_r{}^{P_n}[k+1]-t_r{}^{P_n}[k]$ and the phase shift in the current ("[k]") switching period is calculated as $\psi_{P_{mn}}[k]=t_r{}^{Phi\ n}[k]-t_r{}^{P_m}[k]$. Based on these quantities and the reference values $T_{swRef}$ and $\psi_{P_{mn}Ref}$, controller 426 ("$C_{sw}(z)$") and controller 422 ("$C_\Phi(z)$") compute a hysteresis value for the next switching period.

Advantages of one or more of the techniques described herein may include: (1) no master phase that must be always operational is required: (2) the number of phases is not limited by constraints such as those restraints indicated in H. Lee, V. I. Utkin, and A. Malinin, "*Chattering reduction using multiphase sliding mode control*," In International Journal of Control, Vol. 82, No. 9, pp. 1720-1737, September 2009 and/or those restraints indicated by equations [1] and [2]; (3) in contrast to constant frequency sliding mode implementations with a Set-Reset flip-flop, no slope compensation is necessary to prevent subharmonic oscillations for d>50% and a better dynamic behavior can be achieved; and (4) in contrast to equivalent control implementations of sliding mode control, the robustness of sliding mode control is preserved and better dynamic behavior can be achieved.

Figure 5:
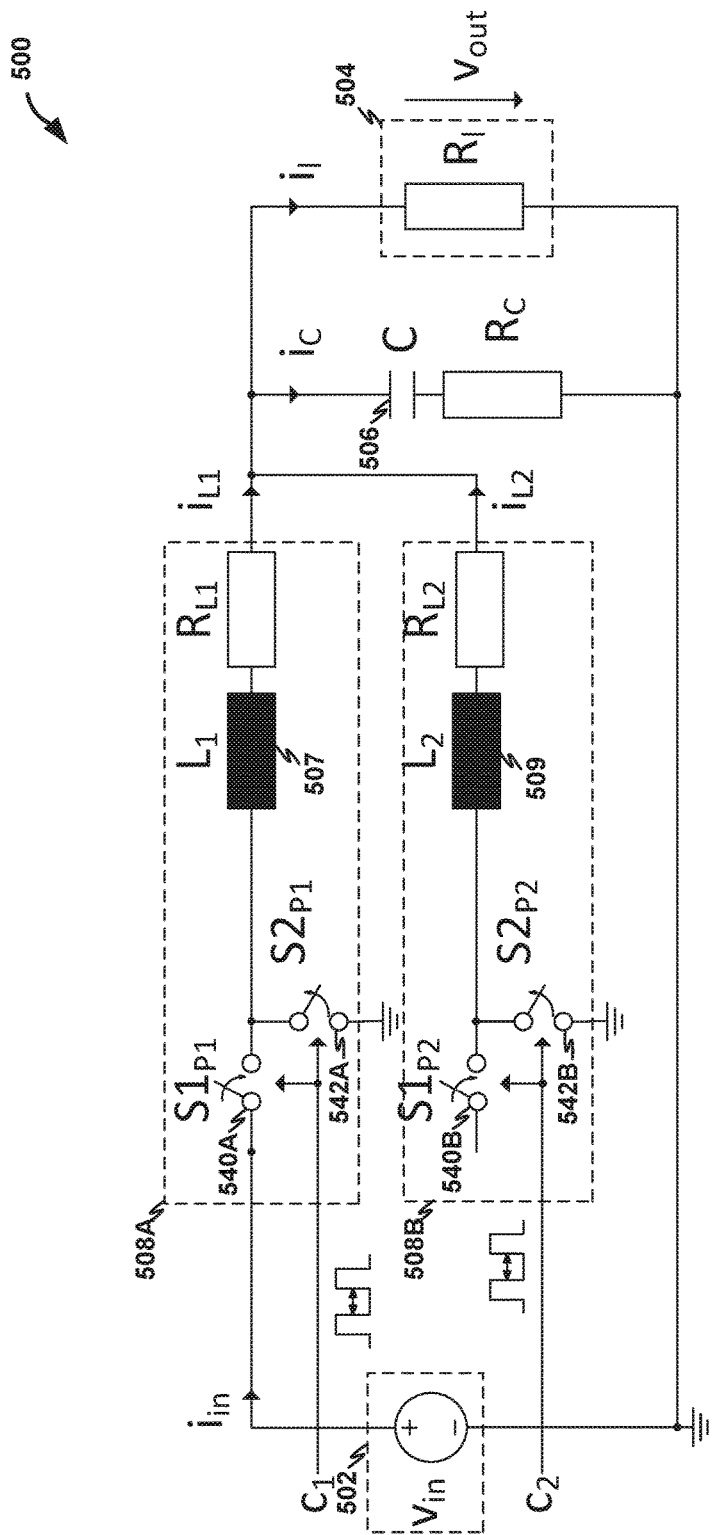
FIG. 5 is a circuit diagram of an example dual-phase Buck converter suitable for control using a dynamic hysteresis value, in accordance with one or more techniques of this disclosure.

FIG. 5 is a circuit diagram of an exemplary dual-phase Buck converter suitable for control using a dynamic hysteresis value, in accordance with one or more techniques of this disclosure. As illustrated, circuit 500 may include voltage source 502, load 504, capacitor 506, and phase switching module 508A and phase switching module 508B (collectively, multi-phase converter 508). FIG. 5 is discussed with reference to FIGS. 1-4 for illustrative purposes only. Voltage source 502 may be an example of voltage source 102 of FIG. 1. Load 504 may be an example of load 104 of FIG. 1. Phase switching module 508A may be an example of phase switching module 108A of FIG. 1. Phase switching module 508B may be an example of phase switching module 108B of FIG. 1. Although FIG. 5 illustrates phase switching module 508A as including switching elements 540A and 542A, in some examples switching element 542A may be a diode. Similarly, although FIG. 5 illustrates phase switching module 508B as including switching elements 540B and 542B, in some examples switching element 542B may be a diode.

In the example of FIG. 5, multi-phase converter 508 is a two-phase interleaved Buck converter. As such, phase switching module 508A and phase switching module 508B may be controlled using a sliding mode controller for a two-phase interleaved Buck converter. An exemplary definition of the sliding surfaces is given as follows.

$$\begin{bmatrix} \sigma_1(x) \\ \sigma_2(x) \end{bmatrix} = \begin{bmatrix} s_1 & s_2 & s_3 & s_4 & 0 \\ s_1 & s_2 & -s_3 & 0 & s_4 \end{bmatrix} \begin{bmatrix} (v_{out} - V_{ref}) \\ \int (v_{out} - V_{ref})dt \\ \int (i_{L_1} - i_{L_2})dt \\ i_{L_1} \\ i_{L_2} \end{bmatrix}, \quad (5)$$

with the switching decision is based on $$c_m = \begin{cases} 0, & \sigma_m(x) > h_m \\ 1, & \sigma_m(x) < h_m \end{cases}. \quad (6)$$

In the above equations, "Vout" is the voltage at load 504, ("$i_{L_1}$") is the current at inductor 507 and ("$i_{L_2}$") is the current at inductor 509.

Figure 6:
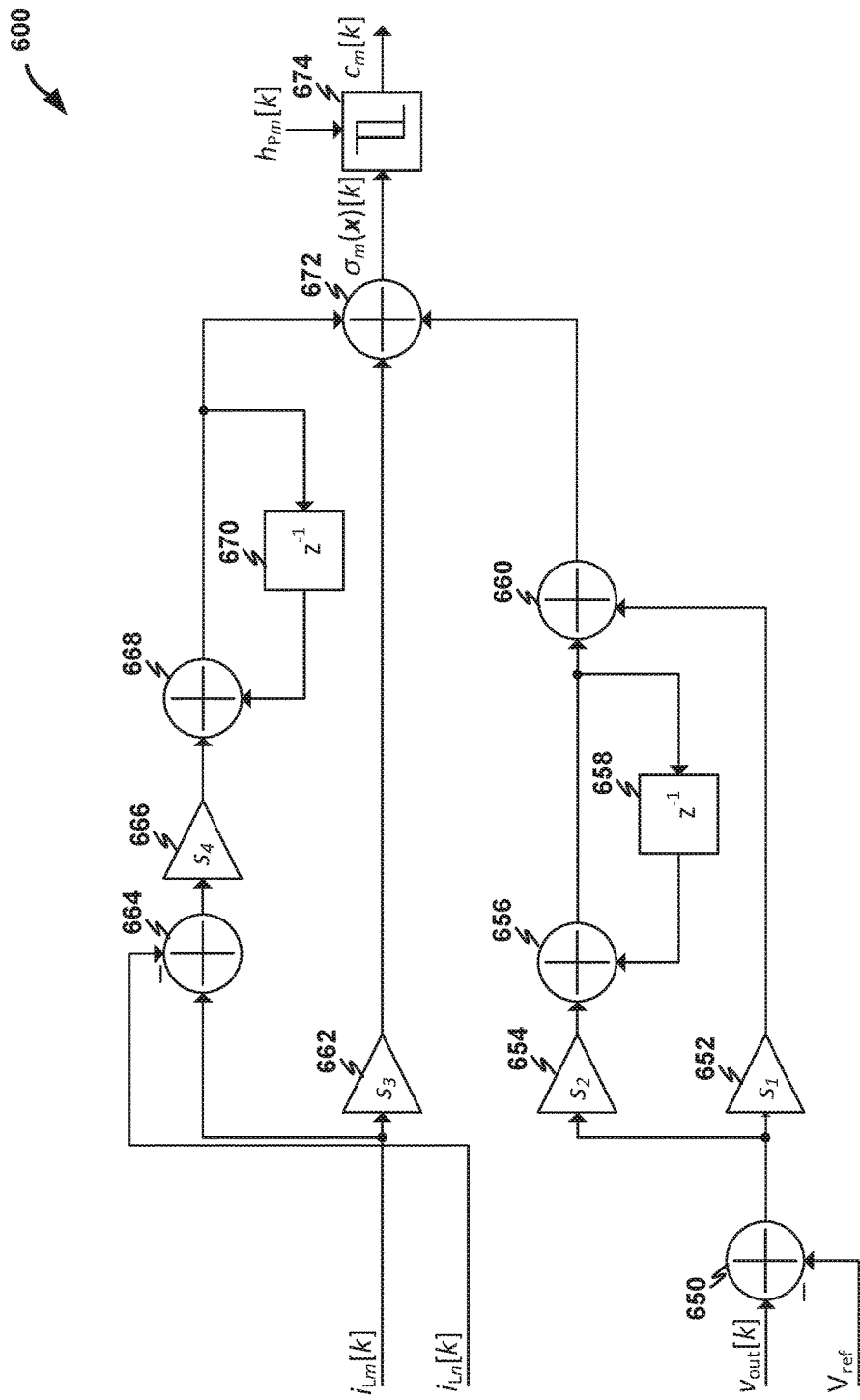
FIG. 6 is a block diagram illustrating a system for generating a switching signal using an exemplary sliding mode control architecture with a dynamic hysteresis value, in accordance with one or more techniques of this disclosure.

FIG. 6 is a block diagram illustrating a system for generating a switching signal using an exemplary sliding mode control architecture with a dynamic hysteresis value, in accordance with one or more techniques of this disclosure. As illustrated, system 600 may include summation block 650, gain block 652, gain block 654, summation block 656, unit delay block 658, summation block 660, gain block 662, summation block 664, gain block 666, summation block 668, unit delay block 670, summation block 672, and hysteretic comparator 674. FIG. 6 is discussed with reference to FIGS. 1-5 for illustrative purposes only. Control module 110 may include one or more digital components configured to perform one or more techniques illustrated in FIG. 6. In some examples, control module 110 may include one or more analog components configured to perform one or more techniques illustrated in FIG. 6. In some examples, control module 110 may include a combination of one or more analog components and one or more digital components configured to perform one or more techniques illustrated in FIG. 6.

It should be noted that it is not necessary to sense the first phase inductor current ("$i_{L_1}$") and second phase inductor current ("$i_{L_2}$"), since they can be digitally reconstructed. For example, the first phase inductor current and the second phase inductor current may be digitally reconstructed using one or more techniques described in A. Berger, M. Agostinelli, R. Priewasser, S. Marsili, and M. Huemer, "*Unified digital sliding mode control with inductor current ripple reconstruction for DC-DC converters*," In Proceedings of the 2015 IEEE International Symposium on Circuits and Systems (ISCAS 2015), pp. 213-216, Lisbon, Portugal, May 2015.

The dynamic hysteresis adaption illustrated in FIG. 6 may be used to achieve a constant switching frequency and the desired phase shift. For example, control module 110 may generate a dynamic hysteresis value ("$h_{P_A}[k+1]$") for the first switching signal ("$c_1$") using a duration of a previous switching period of the first switching signal ("$T_{swP_A}[k-1]$") and a phase shift between the first switching signal and the second switching signal. Similarly, control module 110 may generate a dynamic hysteresis value ("$h_{P_B}[k+1]$") for the second switching signal ("$c_2$") using a duration of a previous switching period of the second switching signal ("$T_{swP_B}[k-1]$") and a phase shift between the first switching signal and the second switching signal.

The switching period ("$T_{swP_m}$") of the set of phases phase ("m"), which include a first phase and a second phase ($m \in \{1,2\}$) may be measured in numbers of clock cycles between two rising edges of the switching signal for a respective phase ("$c_m$"). The phase shift ("$\Phi_{P_{12}}$") may be measured in numbers of clock cycles between the rising edges of between the switching signal for the first phase ("$c_1$") and the switching signal for the second phase "($c_2$")".

Figure 7:
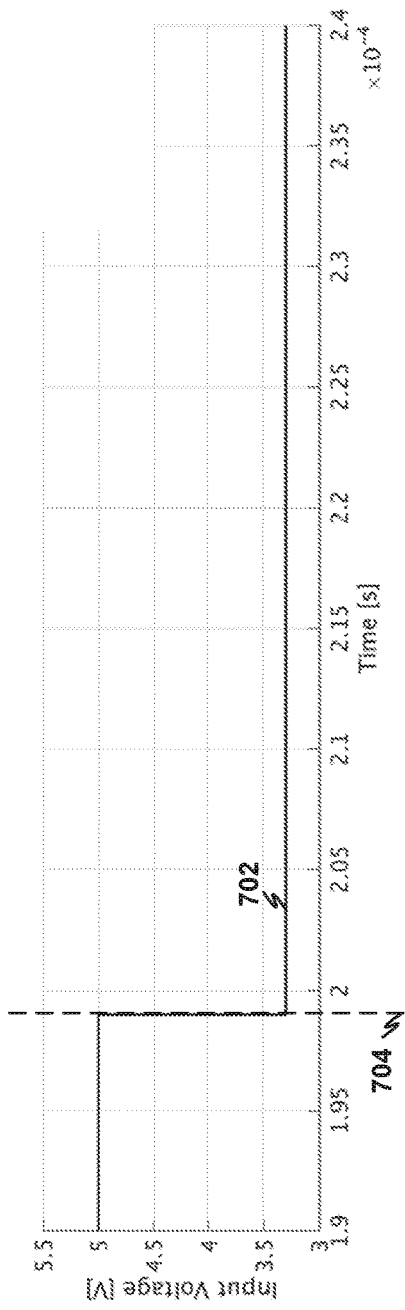
FIG. 7 is a graphical illustration of an input voltage transient, in accordance with one or more techniques of this disclosure.

FIG. 7 is a graphical illustration of an input voltage transient, in accordance with one or more techniques of this disclosure. The abscissa axis (e.g., horizontal) of FIG. 7 represents time and the ordinate axis (e.g., vertical) of FIG. 7 represents input voltage 702. For instance, the ordinate axis (e.g., vertical) of FIG. 7 may represent a voltage output by voltage source 102 of FIG. 1. FIG. 7 is discussed with respect to FIGS. 1-6 for exemplary purposes only. Simulations for a two-phase Buck converter are illustrated in FIGS. 7-10 for exemplary purposes only. In the example of FIG. 7, input voltage 702 changes at time 704 from 5 volts (V) to 3.3 volts (V).

Figure 8:
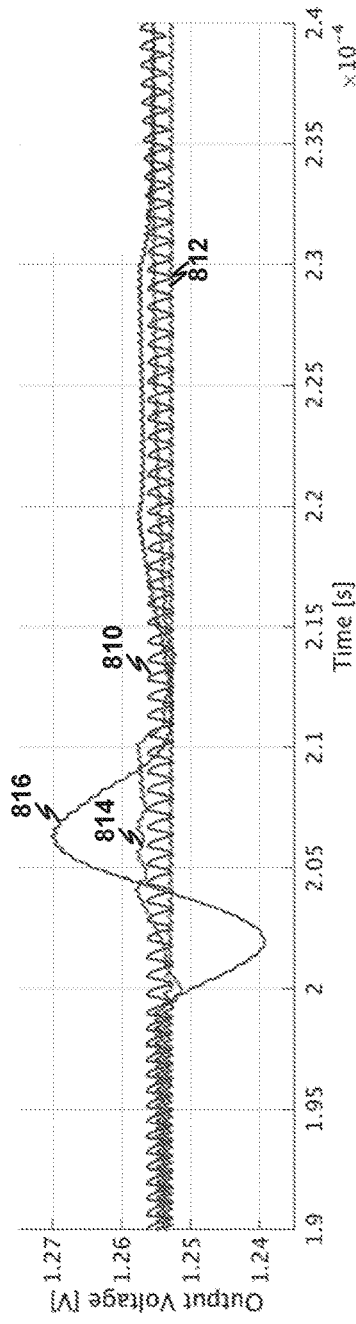
FIG. 8 is a graphical illustration of an output voltage performance of sliding mode control using a dynamic hysteresis value during the input voltage transient of FIG. 7, in accordance with one or more techniques of this disclosure.

FIG. 8 is a graphical illustration of an output voltage performance of sliding mode control using a dynamic hysteresis value during the input voltage transient of FIG. 7, in accordance with one or more techniques of this disclosure. The abscissa axis (e.g., horizontal) of FIG. 8 represents time and the ordinate axis (e.g., vertical) of FIG. 8 represents output voltage 810 for static hysteresis techniques, output voltage 812 for one or more techniques described herein, output voltage 814 for set-reset flip-flop ("SR-FF"), output voltage 816 for equivalent control. For instance, the ordinate axis (e.g., vertical) of FIG. 8 may represent voltage 810 output at load 104 of FIG. 1 when control module 110 is configured for static hysteresis techniques, voltage 812 output at load 104 of FIG. 1 when control module 110 is configured for one or more techniques described herein using a dynamic hysteresis value, voltage 814 output at load 104 of FIG. 1 when control module 110 is configured for set-reset flip-flop, and voltage 816 output at load 104 of FIG. 1 when control module 110 is configured for equivalent control. FIG. 8 is discussed with respect to FIGS. 1-7 for exemplary purposes only.

FIG. 8 illustrates the influence of input voltage 702 of FIG. 7 on output voltage. It noted, that techniques for sliding control that use a master phase have not been evaluated because conditions for sliding control that use a master phase are not fulfilled. Techniques using a static hysteresis band is included only as a reference, because constant frequency and interleaving are not achieved with these techniques. As can be seen in FIG. 8, output voltage 812 reacts fastest to the input voltage change illustrated by input voltage 702 of FIG. 7 and thus the smallest output voltage transient is visible compared to output voltages 810, 814, and 816.

Figure 9:
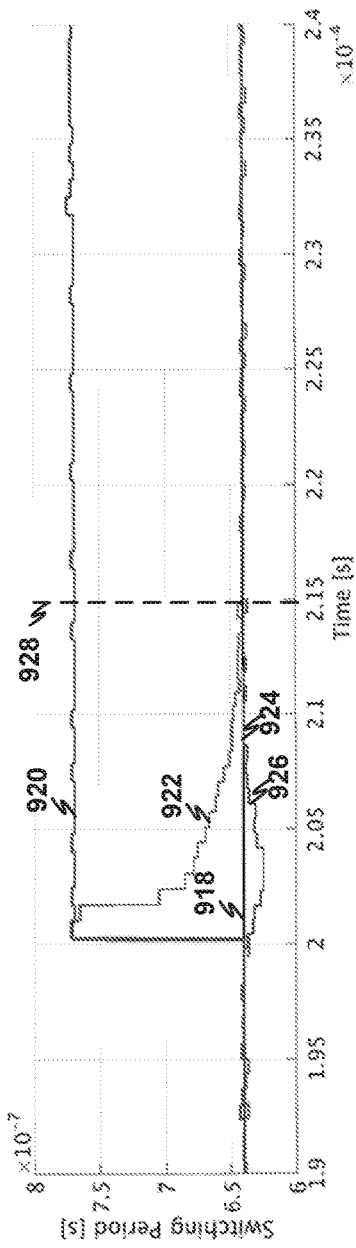
FIG. 9 is a graphical illustration of a switching period performance of sliding mode control using a dynamic hysteresis value during the input voltage transient of FIG. 7, in accordance with one or more techniques of this disclosure.

FIG. 9 is a graphical illustration of a switching period performance of sliding mode control using a dynamic hysteresis value during the input voltage transient of FIG. 7, in accordance with one or more techniques of this disclosure. The abscissa axis (e.g., horizontal) of FIG. 9 represents time and the ordinate axis (e.g., vertical) of FIG. 9 represents a reference switching period 918, switching period 920 for static hysteresis techniques, switching period 922 for one or more techniques described herein, switching period 924 for set-reset flip-flop ("SR-FF"), and switching period 926 for equivalent control. For instance, the ordinate axis (e.g., vertical) of FIG. 9 may represent switching period 920 for phase switching module 108A of FIG. 1 when control module 110 is configured for static hysteresis techniques, switching period 922 for phase switching module 108A when control module 110 is configured for one or more techniques described herein using a dynamic hysteresis value, switching period 924 for phase switching module 108A when control module 110 is configured for set-reset flip-flop, and switching period 926 for phase switching module 108A when control module 110 is configured for equivalent control. FIG. 9 is discussed with respect to FIGS. 1-8 for exemplary purposes only.

FIG. 9 illustrates the influence of input voltage 702 of FIG. 7 on the switching frequency. As illustrated in FIG. 9, switching period 922 for one or more techniques described herein corresponds to reference switching period 918 at time 928, and therefore frequency, is restored after a short transient time. A small frequency change during the transient is caused by set-reset flip-flop schemes and equivalent control schemes (only switching period 926 is visible because switching period 926 overlaps switching period 924). However, as shown, switching period 922 for one or more techniques described herein has an improved dynamic performance compared to the set-reset flip-flop schemes and equivalent control schemes.

Figure 10:
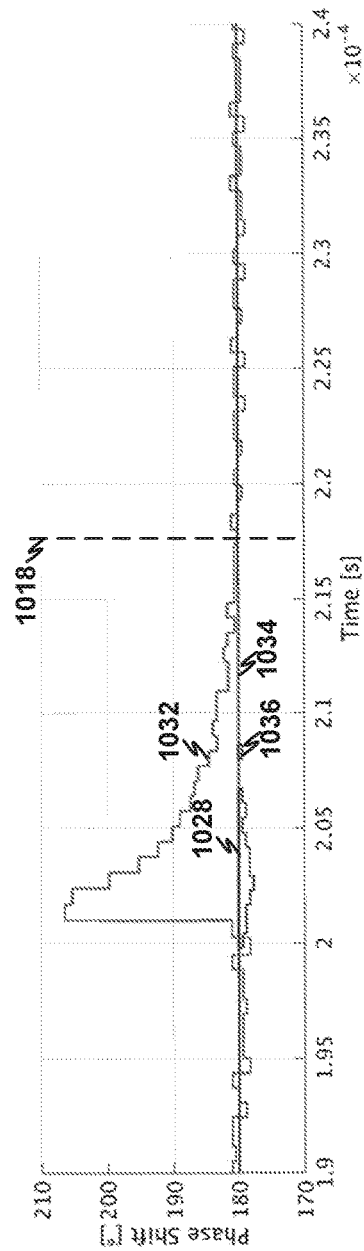
FIG. 10 is a graphical illustration of a phase shift performance of sliding mode control using a dynamic hysteresis value during the input voltage transient of FIG. 7, in accordance with one or more techniques of this disclosure.

FIG. 10 is a graphical illustration of a phase shift performance of sliding mode control using a dynamic hysteresis value during the input voltage transient of FIG. 7, in accordance with one or more techniques of this disclosure. The abscissa axis (e.g., horizontal) of FIG. 10 represents time and the ordinate axis (e.g., vertical) of FIG. 10 represents a reference phase shift 1028, phase shift 1032 for one or more techniques described herein, phase shift 1034 for set-reset flip-flop ("SR-FF"), and phase shift 1036 for equivalent control. For instance, the ordinate axis (e.g., vertical) of FIG. 10 may represent phase shift 1032 between phase switching module 108A and phase switching module 108B of FIG. 1 when control module 110 is configured for one or more techniques described herein using a dynamic hysteresis value, phase shift 1034 between phase switching module 108A and phase switching module 108B of FIG. 1 when control module 110 is configured for set-reset flip-flop, and phase shift 1036 between phase switching module 108A and phase switching module 108B of FIG. 1 when control module 110 is configured for equivalent control. FIG. 10 is discussed with respect to FIGS. 1-9 for exemplary purposes only. Note that a phase shift for the static techniques is not illustrated in FIG. 9 because interleaving is not achieved using the static scheme (e.g., zero degree phase shift).

FIG. 10 illustrates the influence of input voltage 702 of FIG. 7 on phase shift. As illustrated in FIG. 10, phase shift 1032 for one or more techniques described herein corresponds to reference switching period 1028 at time 1018, and therefore phase shift, is restored after a short transient time. A small phase shift change during the transient is caused by set-reset flip-flop schemes and equivalent control schemes (only phase shift 1036 is visible because phase shift 1036 overlaps phase shift 1034). However, as shown, phase shift 1032 for one or more techniques described herein has an improved dynamic performance compared to the set-reset flip-flop schemes and equivalent control schemes.

Figure 11:
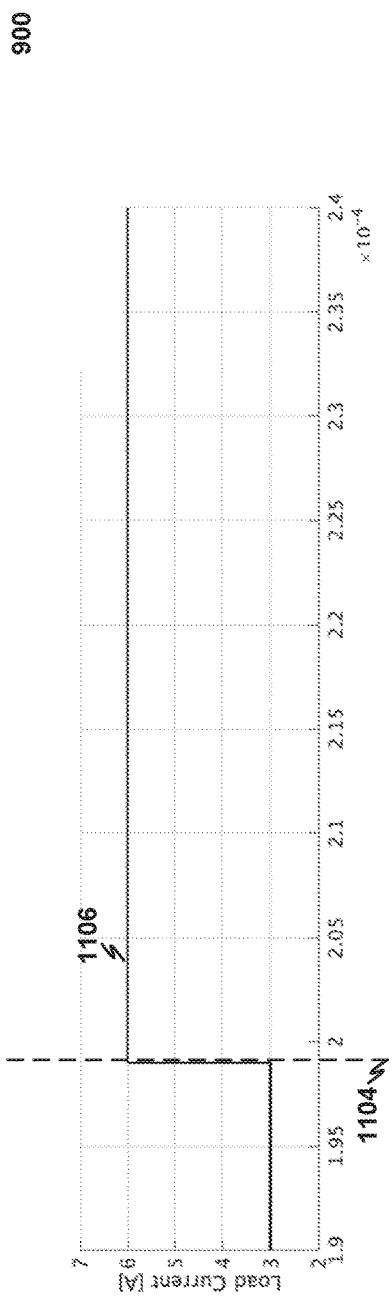
FIG. 11 is a graphical illustration of a load transient, in accordance with one or more techniques of this disclosure.

FIG. 11 is a graphical illustration of a load transient, in accordance with one or more techniques of this disclosure. The abscissa axis (e.g., horizontal) of FIG. 11 represents time and the ordinate axis (e.g., vertical) of FIG. 11 represents load current 1106. For instance, the ordinate axis (e.g., vertical) of FIG. 11 may represent a load current at load 104 of FIG. 1. FIG. 11 is discussed with respect to FIGS. 1-10 for exemplary purposes only. Simulations for a two-phase Buck converter are illustrated in FIGS. 11-14 for exemplary purposes only. In the example of FIG. 11, load current 1106 changes at time 1104 from 3 Amperes (A) to 6 Amperes (A).

Figure 12:
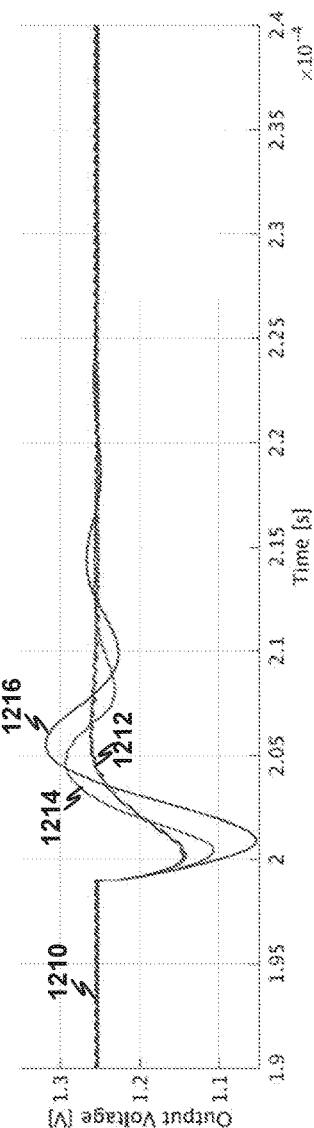
FIG. 12 is a graphical illustration of an output voltage performance of sliding mode control using a dynamic hysteresis value during the load transient of FIG. 11, in accordance with one or more techniques of this disclosure.

FIG. 12 is a graphical illustration of an output voltage performance of sliding mode control using a dynamic hysteresis value during the load transient of FIG. 11, in accordance with one or more techniques of this disclosure. The abscissa axis (e.g., horizontal) of FIG. 12 represents time and the ordinate axis (e.g., vertical) of FIG. 12 represents output voltage 1210 for static hysteresis techniques, output voltage 1212 for one or more techniques described herein, output voltage 1214 for set-reset flip-flop ("SR-FF"), output voltage 1216 for equivalent control. For instance, the ordinate axis (e.g., vertical) of FIG. 12 may represent output voltage 1210 output at load 104 of FIG. 1 when control module 110 is configured for static hysteresis techniques, output voltage 1212 output at load 104 of FIG. 1 when control module 110 is configured for one or more techniques described herein using a dynamic hysteresis value, output voltage 1214 output at load 104 of FIG. 1 when control module 110 is configured for set-reset flip-flop, and output voltage 1216 output at load 104 of FIG. 1 when control module 110 is configured for equivalent control. FIG. 12 is discussed with respect to FIGS. 1-11 for exemplary purposes only.

FIG. 12 illustrates the influence of load current 1106 of FIG. 11 on output voltage. In the example of FIG. 11, output voltage 1212 for one or more techniques described herein reacts faster to the change in load current 1106 of FIG. 11 than output voltages 1210, 1214, and 1216. Moreover, output voltage 1212 for one or more techniques described herein has a lower undershoot and settling time than output voltages 1210, 1214, and 1216.

FIG. 13 is a graphical illustration of a switching period performance of sliding mode control using a dynamic hysteresis value during the load transient of FIG. 11, in accordance with one or more techniques of this disclosure. The abscissa axis (e.g., horizontal) of FIG. 13 represents time and the ordinate axis (e.g., vertical) of FIG. 13 represents a reference switching period 1318, switching period 1320 for static hysteresis techniques, switching period 1322 for one or more techniques described herein, switching period 1324 for set-reset flip-flop ("SR-FF"), and switching period 1326 for equivalent control. For instance, the ordinate axis (e.g., vertical) of FIG. 13 may represent switching period 1320 for phase switching module 108A of FIG. 1 when control module 110 is configured for static hysteresis techniques, switching period 1322 for phase switching module 108A when control module 110 is configured for one or more techniques described herein using a dynamic hysteresis value, switching period 1324 for phase switching module 108A when control module 110 is configured for set-reset flip-flop, and switching period 1326 for phase switching module 108A when control module 110 is configured for equivalent control. FIG. 13 is discussed with respect to FIGS. 1-12 for exemplary purposes only.

FIG. 13 illustrates the influence of load current 1106 of FIG. 11 on the switching frequency. As illustrated in FIG. 13, switching period 1322 for one or more techniques described herein corresponds to reference switching period 1318 at time 1328, and therefore frequency, is restored after a short transient time. A small frequency change during the transient is caused by set-reset flip-flop schemes and equivalent control schemes (only switching period 1326 is visible because switching period 1326 overlaps switching period 1324).

FIG. 14 is a graphical illustration of a phase shift performance of sliding mode control using a dynamic hysteresis value during the load transient of FIG. 11, in accordance with one or more techniques of this disclosure. The abscissa axis (e.g., horizontal) of FIG. 14 represents time and the ordinate axis (e.g., vertical) of FIG. 14 represents a reference phase shift 1428, phase shift 1432 for one or more techniques described herein, phase shift 1434 for set-reset flip-flop ("SR-FF"), and phase shift 1436 for equivalent control. For instance, the ordinate axis (e.g., vertical) of FIG. 14 may represent phase shift 1432 between phase switching module 108A and phase switching module 108B of FIG. 1 when control module 110 is configured for one or more techniques described herein using a dynamic hysteresis value, phase shift 1434 between phase switching module 108A and phase switching module 108B of FIG. 1 when control module 110 is configured for set-reset flip-flop, and phase shift 1436 between phase switching module 108A and phase switching module 108B of FIG. 1 when control module 110 is configured for equivalent control. FIG. 14 is discussed with respect to FIGS. 1-13 for exemplary purposes only. Note that a phase shift for the static techniques is not illustrated in FIG. 14 because interleaving is not achieved using the static scheme (e.g., 0° phase shift).

FIG. 14 illustrates the influence of load current 1107 of FIG. 11 on phase shift. As illustrated in FIG. 14, phase shift 1432 for one or more techniques described herein corresponds to reference phase shift 1428 at time 1418, and therefore phase shift, is restored after a short transient time. A small phase shift change during the transient is caused by set-reset flip-flop schemes and equivalent control schemes (only phase shift 1436 is visible because phase shift 1436 overlaps phase shift 1434). However, as shown, phase shift 1432 for one or more techniques described herein has an improved dynamic performance compared to the set-reset flip-flop schemes and equivalent control schemes.

Figure 15:
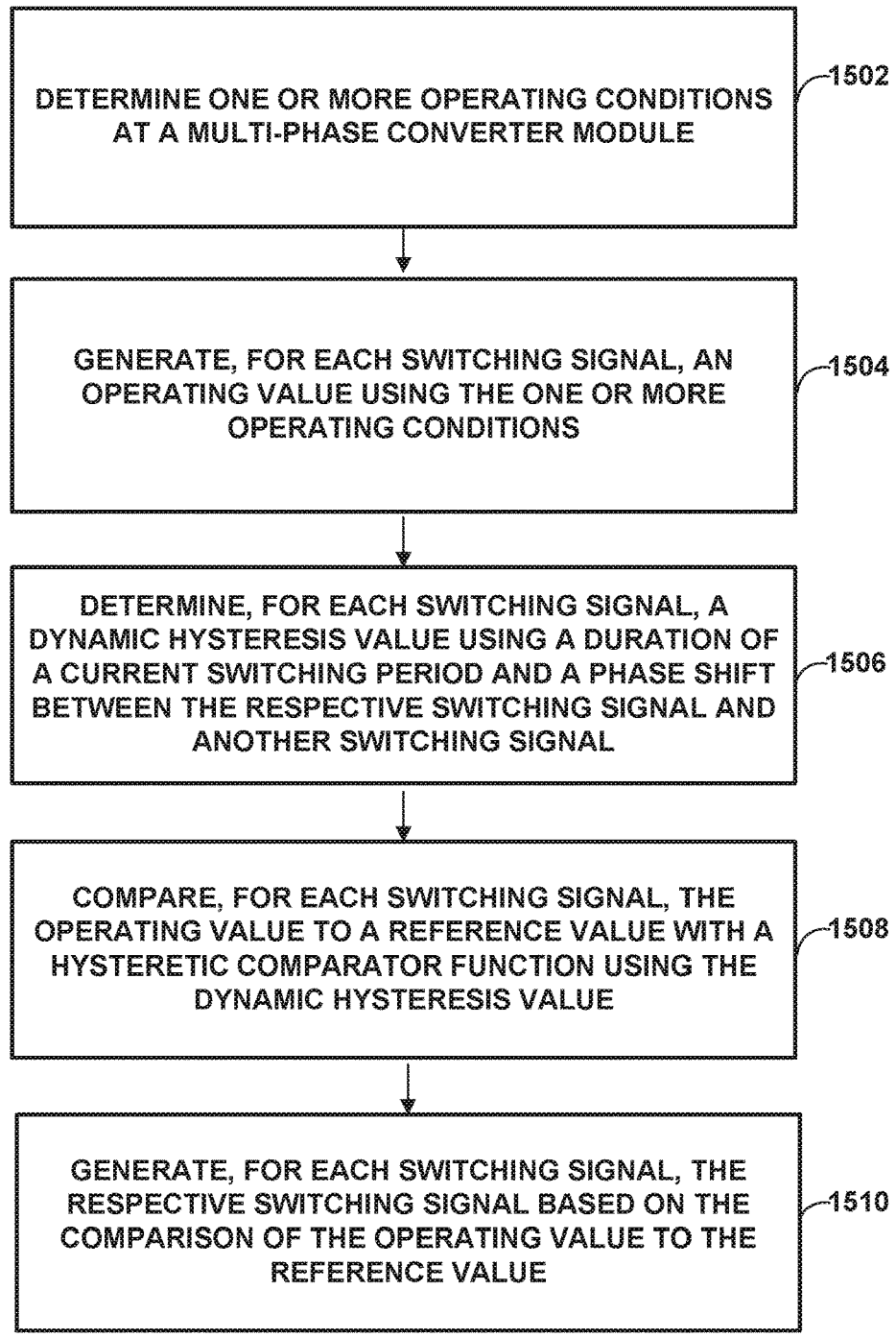
FIG. 15 is a flow diagram consistent with techniques for a dynamic hysteresis value that may be performed by a circuit in accordance with this disclosure.

FIG. 15 is a flow diagram consistent with techniques for a dynamic hysteresis value that may be performed by a circuit in accordance with this disclosure. For purposes of illustration only, the example operations are described below within the context of FIGS. 1-14.

In accordance with one or more techniques of this disclosure, control module 110 determines one or more operating conditions at multi-phase converter module 108 (1502). Control module 110 generates, for each switching signal, an operating value using the one or more operating conditions (1504). For example, control module 110 generates, for each switching signal, a sliding function using the one or more operating conditions. In some examples, control module 110 generates, for each switching signal, an estimation of a current and/or voltage using the one or more operating conditions.

Control module 110 determines, for each switching signal, a dynamic hysteresis value using a duration of a current switching period and a phase shift between the respective switching signal and another switching signal (1506). Control module 110 compares, for each switching signal, the operating value to a reference value with a hysteretic comparator function using the dynamic hysteresis value (1508). Control module 110 generates, for each switching signal, the respective switching signal based on the comparison of the operating value to the reference value (1510).

Figure 16:
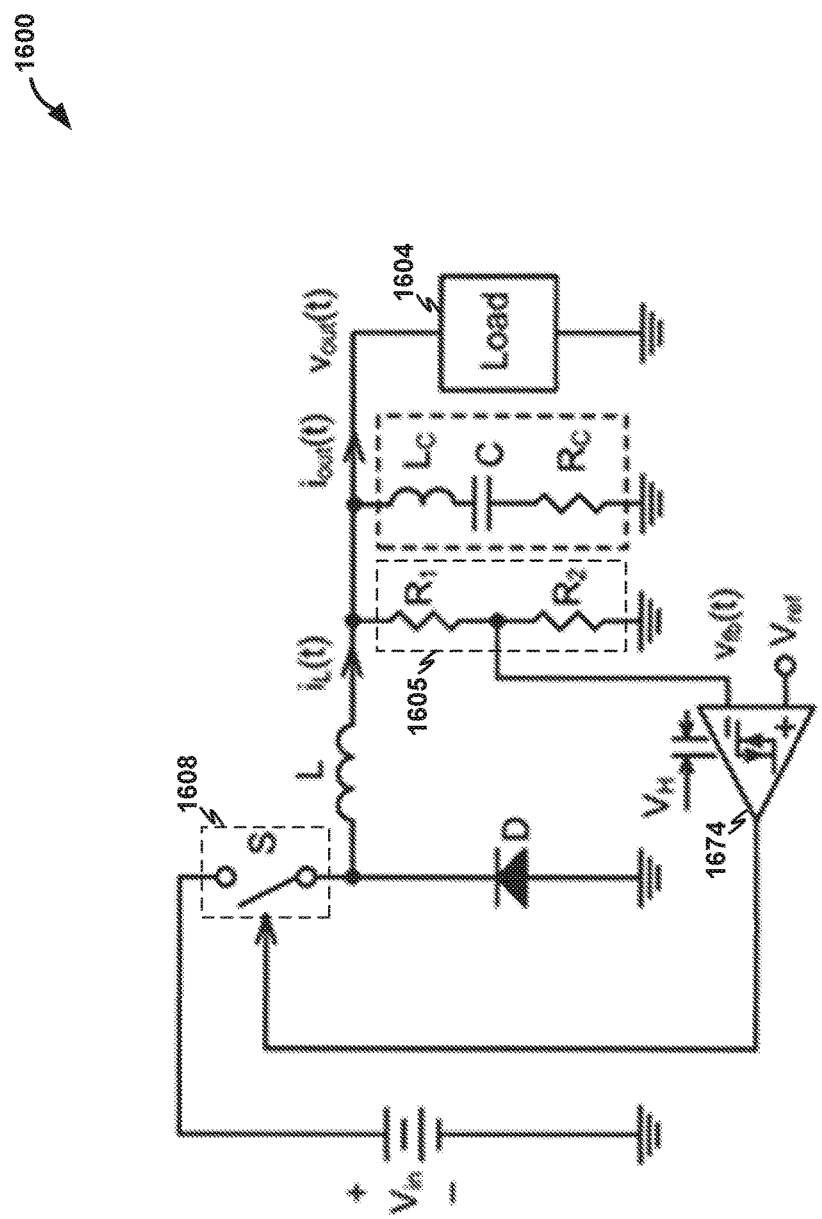
FIG. 16 is a block diagram illustrating a system for generating a switching signal using an exemplary hysteretic comparator on an output voltage with a dynamic hysteresis value, in accordance with one or more techniques of this disclosure.

FIG. 16 is a block diagram illustrating system 1600 for generating a switching signal using an exemplary hysteretic comparator 1674 on an output voltage with a dynamic hysteresis value, in accordance with one or more techniques of this disclosure. As shown in FIG. 16, system 1600 may include load 1604, voltage divider 1605, switch 1608, and hysteretic comparator 1674. One or more techniques described herein for adjusting switching frequency and phase shift may be applied to hysteretic comparator 1674 on the output voltage. In the example of FIG. 16, the operating value is an indication of the output voltage. For example, hysteretic comparator 1674 may control switch 1608 to regulate a voltage at load 1604 based an indication of the output voltage output by voltage divider 1605. More specifically, for example, hysteretic comparator 1674 may compare the indication of the output voltage output by voltage divider 1605 to a reference value "Vref" using the dynamic hysteresis value.

Figure 17:
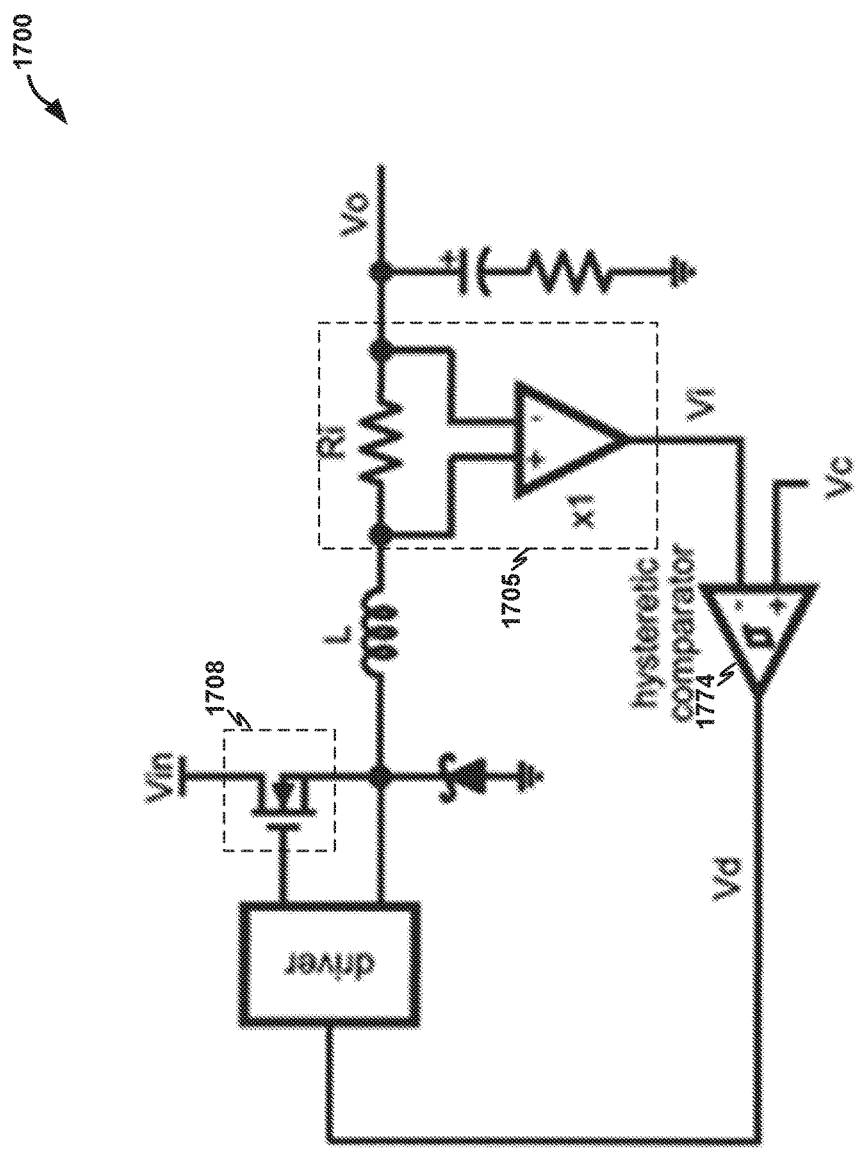
FIG. 17 is a block diagram illustrating a system for generating a switching signal using an exemplary hysteretic current-mode control with a dynamic hysteresis value, in accordance with one or more techniques of this disclosure.

FIG. 17 is a block diagram illustrating system 1700 for generating a switching signal using an exemplary hysteretic current-mode control with a dynamic hysteresis value, in accordance with one or more techniques of this disclosure. As shown in FIG. 17, system 1700 may include current sensor 1705, switch 1708, and hysteretic comparator 1774. One or more techniques described herein for adjusting switching frequency and phase shift may be applied to hysteretic comparator 1774. In the example of FIG. 17, the operating value is an indication of current. For example, hysteretic comparator 1774 may control switch 1708 to regulate a current based an indication of the current output by current sensor 1705. More specifically, for example, hysteretic comparator 1774 may compare the indication of the current output by current sensor 1705 to a reference value "Vc" using the dynamic hysteresis value.

The following examples may illustrate one or more aspects of the disclosure.

Example 1

A circuit for controlling a multi-phase converter, the circuit being configured to: determine one or more operating conditions at a multi-phase converter module, wherein each phase switching module of a plurality of phase switching modules is configured to electrically couple, based on a respective switching signal of a plurality of switching signals, a voltage source to a respective phase of the multi-phase converter module; generate, for each switching signal of the plurality of switching signals, an operating value for a respective switching signal of the plurality of switching signals using the one or more operating conditions; determine, for each switching signal of the plurality of switching signals, a dynamic hysteresis value for a next switching period of the respective switching signal using a duration of a previous switching period of the respective switching signal and a phase shift between the respective switching signal and a switching signal of the plurality of switching signals that is different than the respective switching signal; compare, for each switching signal of the plurality of switching signals, the operating value to a reference value with a hysteretic comparator function using the dynamic hysteresis value; and generate, for each switching signal of the plurality of switching signals, the respective switching signal based on the comparison of the operating value to the reference value.

Example 2

The circuit of example 1, wherein, to determine the dynamic hysteresis value, the circuit is configured to: generate a switching period error value based on a comparison of the duration of the previous switching period of the respective switching signal to a reference switching period.

Example 3

The circuit of any combination of examples 1-2, wherein, to determine the dynamic hysteresis value, the circuit is configured to: generate a switching period correction value for the switching period error value using a proportional, integral, and derivative controller.

Example 4

The circuit of any combination of examples 1-3, wherein, to determine the dynamic hysteresis value, the circuit is configured to: generate a phase shift error value based on a comparison of the phase shift to a reference phase shift.

Example 5

The circuit of any combination of examples 1-4, wherein, to determine the dynamic hysteresis value, the circuit is configured to: generate a phase correction value for the phase shift error value using a proportional, integral, and derivative controller.

Example 6

The circuit of any combination of examples 1-5, wherein, to determine the dynamic hysteresis value, the circuit is configured to: subtract a digital counter value at a rising edge in the current switching period of the respective switching signal from a digital counter value at a rising edge in the next switching period of the respective switching signal to determine the duration of the current switching period of the respective switching signal.

Example 7

The circuit of any combination of examples 1-6, wherein, to determine the dynamic hysteresis value, the circuit is configured to: determine a difference between a digital counter value at a rising edge in the current switching period of the respective switching signal and a digital counter value at a rising edge in a current switching period of the switching signal of the plurality of switching signals that is different than the respective switching signal to determine the phase shift.

Example 8

The circuit of any combination of examples 1-7, wherein each phase of the multi-phase converter module comprises a respective inductor of a plurality of inductors, and wherein, to determine the one or more operating conditions, the circuit is configured to: determine an output voltage supplied by the multi-phase converter module to the load; and determine, for each switching signal of the plurality of switching signals, a current at a respective inductor of the plurality of inductors.

Example 9

The circuit of any combination of examples 1-8, comprising: a first summation block configured to subtract the phase shift from a reference phase shift to generate a phase shift error value for the respective switching signal; a first proportional, integral, and derivative controller configured to receive the phase shift error value from the first summation block and generate a phase correction value for the respective switching signal; a second summation block configured to subtract the duration of the previous switching period of the respective switching signal from a reference switching period to generate a switching period error value for the respective switching signal; a second proportional, integral, and derivative controller configured to receive the switching period error value from the second summation block and generate a switching period correction value for the respective switching signal; a third summation block configured to sum the phase correction value and the switching period correction value to generate the dynamic hysteresis value for the next switching period of the respective switching signal; a hysteretic comparator configured to receive the dynamic hysteresis value from the third summation block and compare the operating value to the reference value using the dynamic hysteresis value to generate a digital counter value at a rising edge in the current switching period of the respective switching signal and a duration of the current switching period of the respective switching signal; a fourth summation block configured to subtract a digital counter value at a rising edge in a current switching period of the switching signal of the plurality of switching signals that is different than the respective switching signal from the digital counter value at the rising edge in the current switching period of the respective switching signal to generate the phase shift; and a unit delay block configured to receive the duration of the current switching period of the respective switching signal from the hysteretic comparator and generate the duration of the previous switching period of the respective switching signal.

Example 10

The circuit of any combination of examples 1-9, wherein the operating value is a sliding function.

Example 11

A method for controlling a multi-phase converter, the method comprising: determining one or more operating conditions at a multi-phase converter module, wherein each phase switching module of a plurality of phase switching modules is configured to electrically couple, based on a respective switching signal of a plurality of switching signals, a voltage source to a respective phase of the multi-phase converter module; generating, for each switching signal of the plurality of switching signals, an operating value for a respective switching signal of the plurality of switching signals using the one or more operating conditions; determining, for each switching signal of the plurality of switching signals, a dynamic hysteresis value for a next switching period of the respective switching signal using a duration of a previous switching period of the respective switching signal and a phase shift between the respective switching signal and a switching signal of the plurality of switching signals that is different than the respective switching signal; comparing, for each switching signal of the plurality of switching signals, the operating value to a reference value with a hysteretic comparator function using the dynamic hysteresis value; and generating, for each switching signal of the plurality of switching signals, the respective switching signal based on the comparison of the operating value to the reference value.

Example 12

The method of example 11, wherein determining the dynamic hysteresis value comprises: generating a switching period error value based on a comparison of the duration of the previous switching period of the respective switching signal to a reference switching period.

Example 13

The method of any combination of examples 11-12, wherein determining the dynamic hysteresis value comprises: generating a switching period correction value for the switching period error value using a proportional, integral, and derivative controller.

Example 14

The method of any combination of examples 11-13, wherein determining the dynamic hysteresis value com-prises: generating a phase shift error value based on a comparison of the phase shift to a reference phase shift.

Example 15

The method of any combination of examples 11-14, wherein determining the dynamic hysteresis value comprises: generating a phase correction value for the phase shift error value using a proportional, integral, and derivative controller.

Example 16

The method of any combination of examples 11-15, wherein determining the dynamic hysteresis value comprises: subtracting a digital counter value at a rising edge in the current switching period of the respective switching signal from a digital counter value at a rising edge in the next switching period of the respective switching signal to determine the duration of the current switching period of the respective switching signal.

Example 17

The method of any combination of examples 11-16, wherein determining the dynamic hysteresis value comprises: determining a difference between a digital counter value at a rising edge in the current switching period of the respective switching signal and a digital counter value at a rising edge in a current switching period of the switching signal of the plurality of switching signals that is different than the respective switching signal to determine the phase shift.

Example 18

The method of any combination of examples 11-17, wherein each phase of the multi-phase converter module comprises a respective inductor of a plurality of inductors, and wherein determining the one or more operating conditions comprises: determining an output voltage supplied by the multi-phase converter module to the load; and determining, for each switching signal of the plurality of switching signals, a current at a respective inductor of the plurality of inductors.

Example 19

The method of any combination of examples 11-18, wherein the operating value is a sliding function.

Example 20

A circuit for a multi-phase converter, the circuit comprising: a multi-phase converter module for supplying an output voltage to a load; a plurality of phase switching modules, wherein each phase switching module of the plurality of phase switching modules is configured to electrically couple, based on a respective switching signal of a plurality of switching signals, a voltage source to a respective phase of the multi-phase converter module; and a control module configured to, for each switching signal of the plurality of switching signals: generate an operating value for a respective switching signal of the plurality of switching signals using the one or more operating conditions; determine a dynamic hysteresis value for a next switching period of the respective switching signal using a duration of a previous switching period of the respective switching signal and a phase shift between the respective switching signal and a switching signal of the plurality of switching signals that is different than the respective switching signal; compare the operating value to a reference value with a hysteretic comparator function using the dynamic hysteresis value; and generate the respective switching signal based on the comparison of the operating value to the reference value.

Example 21

The circuit of example 20, wherein the multi-phase converter is a two-phase interleaved buck converter, wherein the plurality of switching signals is two switching signals, and wherein, to determine the dynamic hysteresis value, the control module is configured to determine the dynamic hysteresis value such that the two switching signals are 180 degrees out of phase.

Example 22

The circuit of any combination of examples 20-21, wherein, to determine the dynamic hysteresis value, the control module is configured to determine the dynamic hysteresis value such that the two switching signals have at a constant switching frequency.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A circuit for controlling a multi-phase converter, the circuit being configured to:
   determine one or more operating conditions at a multi-phase converter module, wherein each phase switching module of a plurality of phase switching modules is configured to electrically couple, based on a respective switching signal of a plurality of switching signals, a voltage source to a respective phase of the multi-phase converter module;
   generate, for each switching signal of the plurality of switching signals, an operating value for the respective switching signal of the plurality of switching signals using the one or more operating conditions;
   determine, for each switching signal of the plurality of switching signals, a dynamic hysteresis value for a current switching period of the respective switching signal using a duration of a previous switching period of the respective switching signal and a phase shift between the respective switching signal and a switching signal of the plurality of switching signals that is different than the respective switching signal, wherein, to determine the dynamic hysteresis value, the circuit is configured to generate a phase shift error value based on a comparison of the phase shift to a reference phase shift;
   compare, for each switching signal of the plurality of switching signals, the operating value to a reference value with a hysteretic comparator function using the dynamic hysteresis value; and
   generate, for each switching signal of the plurality of switching signals, the respective switching signal based on the comparison of the operating value to the reference value.

2. The circuit of claim 1, wherein, to determine the dynamic hysteresis value, the circuit is configured to:
   generate a switching period error value based on a comparison of the duration of the previous switching period of the respective switching signal to a reference switching period.

3. The circuit of claim 2, wherein, to determine the dynamic hysteresis value, the circuit is configured to:
   generate a switching period correction value for the switching period error value using a proportional, integral, and derivative controller.

4. The circuit of claim 1, wherein, to determine the dynamic hysteresis value, the circuit is configured to:
   generate a phase correction value for the phase shift error value using a proportional, integral, and derivative controller.

5. The circuit of claim 1, wherein, to determine the dynamic hysteresis value, the circuit is configured to:
   subtract a digital counter value at a rising edge in the current switching period of the respective switching signal from a digital counter value at a rising edge in a next switching period of the respective switching signal to determine the duration of the current switching period of the respective switching signal.

6. The circuit of claim 1, wherein, to determine the dynamic hysteresis value, the circuit is configured to:
   determine a difference between a digital counter value at a rising edge in the current switching period of the respective switching signal and a digital counter value at a rising edge in a current switching period of the switching signal of the plurality of switching signals that is different than the respective switching signal to determine the phase shift.

7. The circuit of claim 1, wherein each phase of the multi-phase converter module comprises a respective inductor of a plurality of inductors, and wherein, to determine the one or more operating conditions, the circuit is configured to:
   determine an output voltage supplied by the multi-phase converter module to a load; and
   determine, for each switching signal of the plurality of switching signals, a current at a respective inductor of the plurality of inductors.

8. The circuit of claim 1, comprising:
a first summation block configured to subtract the phase shift from a reference phase shift to generate a phase shift error value for the respective switching signal;
a first proportional, integral, and derivative controller configured to receive the phase shift error value from the first summation block and generate a phase correction value for the respective switching signal;
a second summation block configured to subtract the duration of the previous switching period of the respective switching signal from a reference switching period to generate a switching period error value for the respective switching signal;
a second proportional, integral, and derivative controller configured to receive the switching period error value from the second summation block and generate a switching period correction value for the respective switching signal;
a third summation block configured to sum the phase correction value and the switching period correction value to generate the dynamic hysteresis value for the current switching period of the respective switching signal;
a hysteretic comparator configured to receive the dynamic hysteresis value from the third summation block and compare the operating value to the reference value using the dynamic hysteresis value to generate a digital counter value at a rising edge in the current switching period of the respective switching signal and a duration of the current switching period of the respective switching signal; and
a fourth summation block configured to subtract a digital counter value at a rising edge in a current switching period of the switching signal of the plurality of switching signals that is different than the respective switching signal from the digital counter value at the rising edge in the current switching period of the respective switching signal to generate the phase shift.

9. The circuit of claim 1, wherein the operating value is a sliding function.

10. A method for controlling a multi-phase converter, the method comprising:
determining one or more operating conditions at a multi-phase converter module, wherein each phase switching module of a plurality of phase switching modules is configured to electrically couple, based on a respective switching signal of a plurality of switching signals, a voltage source to a respective phase of the multi-phase converter module;
generating, for each switching signal of the plurality of switching signals, an operating value for the respective switching signal of the plurality of switching signals using the one or more operating conditions;
determining, for each switching signal of the plurality of switching signals, a dynamic hysteresis value for a current switching period of the respective switching signal using a duration of a previous switching period of the respective switching signal and a phase shift between the respective switching signal and a switching signal of the plurality of switching signals that is different than the respective switching signal, wherein determining the dynamic hysteresis value comprises generating a phase shift error value based on a comparison of the phase shift to a reference phase shift;
comparing, for each switching signal of the plurality of switching signals, the operating value to a reference value with a hysteretic comparator function using the dynamic hysteresis value; and
generating, for each switching signal of the plurality of switching signals, the respective switching signal based on the comparison of the operating value to the reference value.

11. The method of claim 10, wherein determining the dynamic hysteresis value comprises:
generating a switching period error value based on a comparison of the duration of the previous switching period of the respective switching signal to a reference switching period.

12. The method of claim 11, wherein determining the dynamic hysteresis value comprises:
generating a switching period correction value for the switching period error value using a proportional, integral, and derivative controller.

13. The method of claim 10, wherein determining the dynamic hysteresis value comprises:
generating a phase correction value for the phase shift error value using a proportional, integral, and derivative controller.

14. The method of claim 10, wherein determining the dynamic hysteresis value comprises:
subtracting a digital counter value at a rising edge in the current switching period of the respective switching signal from a digital counter value at a rising edge in a next switching period of the respective switching signal to determine the duration of the current switching period of the respective switching signal.

15. The method of claim 10, wherein determining the dynamic hysteresis value comprises:
determining a difference between a digital counter value at a rising edge in the current switching period of the respective switching signal and a digital counter value at a rising edge in a current switching period of the switching signal of the plurality of switching signals that is different than the respective switching signal to determine the phase shift.

16. The method of claim 10, wherein each phase of the multi-phase converter module comprises a respective inductor of a plurality of inductors, and wherein determining the one or more operating conditions comprises:
determining an output voltage supplied by the multi-phase converter module to a load; and
determining, for each switching signal of the plurality of switching signals, a current at a respective inductor of the plurality of inductors.

17. The method of claim 10, wherein the operating value is a sliding function.

18. A circuit for a multi-phase converter, the circuit comprising:
a multi-phase converter module for supplying an output voltage to a load;
a plurality of phase switching modules, wherein each phase switching module of the plurality of phase switching modules is configured to electrically couple, based on a respective switching signal of a plurality of switching signals, a voltage source to a respective phase of the multi-phase converter module; and
a control module configured to, for each switching signal of the plurality of switching signals:
generate an operating value for the respective switching signal of the plurality of switching signals using the one or more operating conditions;
determine a dynamic hysteresis value for a current switching period of the respective switching signal using a duration of a previous switching period of the respective switching signal and a phase shift between the respective switching signal and a switching signal of the plurality of switching signals that is different than the respective switching signal, wherein, to determine the dynamic hysteresis value, the control module is configured to generate a phase shift error value based on a comparison of the phase shift to a reference phase shift;

compare the operating value to a reference value with a hysteretic comparator function using the dynamic hysteresis value; and generate the respective switching signal based on the comparison of the operating value to the reference value.

* * * * *